United States Patent
Riggert et al.

(10) Patent No.: US 8,375,139 B2
(45) Date of Patent: Feb. 12, 2013

(54) NETWORK STREAMING OVER MULTIPLE DATA COMMUNICATION CHANNELS USING CONTENT FEEDBACK INFORMATION

(75) Inventors: Eric Riggert, Lake Forest, CA (US); Martin Martinez, Ladera Ranch, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 254 days.

(21) Appl. No.: 12/825,279

(22) Filed: Jun. 28, 2010

(65) Prior Publication Data

US 2011/0320625 A1 Dec. 29, 2011

(51) Int. Cl.
G06F 15/16 (2006.01)

(52) U.S. Cl. ........ 709/231; 709/230; 709/234; 370/331; 370/335; 370/395.21

(58) Field of Classification Search .......... 709/230–234; 370/331–395.21
See application file for complete search history.

(56) References Cited

U.S. PATENT DOCUMENTS

| | | | |
|---|---|---|---|
| 4,216,374 A | 8/1980 | Lam et al. | |
| 4,625,315 A | 11/1986 | Lemberger et al. | |
| 4,896,374 A | 1/1990 | Waugh et al. | |
| 5,045,713 A | 9/1991 | Shima | |
| 5,267,271 A | 11/1993 | Rice | |
| 5,311,502 A | 5/1994 | Mueller et al. | |
| 5,444,705 A | 8/1995 | Olnowich et al. | |
| 5,452,328 A | 9/1995 | Rice | |
| 5,539,306 A | 7/1996 | Riggio, Jr. | |
| 5,815,526 A | 9/1998 | Rice | |
| 5,991,333 A | 11/1999 | Rice | |
| 6,208,618 B1 | 3/2001 | Kenney et al. | |
| 6,377,992 B1 | 4/2002 | Plaza Fernandez et al. | |
| 6,490,283 B1 | 12/2002 | Ganor et al. | |
| 6,512,774 B1 | 1/2003 | Vepa et al. | |
| 6,560,630 B1 | 5/2003 | Vepa et al. | |
| 6,639,582 B1 | 10/2003 | Shrader | |
| 6,687,758 B2 | 2/2004 | Craft et al. | |
| 6,757,725 B1 | 6/2004 | Frantz et al. | |
| 6,938,092 B2 | 8/2005 | Burns | |
| 6,963,932 B2 | 11/2005 | Bhat | |
| 7,027,439 B1 | 4/2006 | Barrow et al. | |
| 7,151,744 B2 | 12/2006 | Sarkinen et al. | |
| 7,203,190 B1 * | 4/2007 | Ruban et al. | 370/356 |
| 7,233,115 B2 | 6/2007 | Lys | |
| 7,256,554 B2 | 8/2007 | Lys | |
| 7,323,931 B2 | 1/2008 | Hong et al. | |
| 7,349,342 B2 | 3/2008 | Carpenter et al. | |

(Continued)

*Primary Examiner* — Wing F Chan
*Assistant Examiner* — Razu Miah
(74) *Attorney, Agent, or Firm* — Fitzpatrick, Cella, Harper & Scinto

(57) ABSTRACT

The present disclosure is directed to sending a single data stream from a sending endpoint to a receiving endpoint. Both of the endpoints each have multiple data communication channels connecting each endpoint to one or more networks, respectively. Different portions of data packets are sent by the sending endpoint over different ones of the multiple data communication channels. Sender content information is sent by the sending endpoint to the receiving endpoint over one or more of the data communication channels. Feedback information is sent by the receiving endpoint over one or more of the data communication channels and is received by the sending endpoint. The feedback information is gathered for each of data communication channels connected to the receiving endpoint. Receiver content information regarding streaming data gathered at the receiving endpoint is sent by the receiving endpoint over one or more of the data communication channels and is received by the sending endpoint.

29 Claims, 9 Drawing Sheets

U.S. PATENT DOCUMENTS

| | | |
|---|---|---|
| 7,404,012 B2 | 7/2008 | Matters et al. |
| 7,447,149 B1 | 11/2008 | Beesley et al. |
| 7,459,864 B2 | 12/2008 | Lys |
| 7,539,759 B2 * | 5/2009 | Narayanan et al. ............ 709/227 |
| 7,545,741 B1 | 6/2009 | Manickavasagam et al. |
| 7,590,051 B1 * | 9/2009 | Skalecki et al. .............. 370/218 |
| 2006/0120311 A1 * | 6/2006 | Berkovich .................... 370/310 |
| 2006/0168293 A1 * | 7/2006 | Sugihara et al. .............. 709/231 |
| 2007/0115864 A1 * | 5/2007 | Bar-Ness et al. ............. 370/278 |
| 2007/0127586 A1 * | 6/2007 | Hafeez .......................... 375/267 |
| 2007/0140303 A1 * | 6/2007 | Kim et al. ..................... 370/503 |
| 2007/0288635 A1 * | 12/2007 | Gu et al. ....................... 709/226 |
| 2008/0002716 A1 * | 1/2008 | Wiley et al. ............... 370/395.21 |
| 2008/0159225 A1 * | 7/2008 | Kim et al. ..................... 370/331 |
| 2008/0165720 A1 * | 7/2008 | Hu et al. ....................... 370/315 |
| 2008/0205409 A1 | 8/2008 | McGee et al. |
| 2008/0285675 A1 * | 11/2008 | Roberts ......................... 375/267 |
| 2008/0310451 A1 * | 12/2008 | Kang et al. .................... 370/474 |
| 2008/0313362 A1 | 12/2008 | Takamoto |
| 2009/0100495 A1 * | 4/2009 | Manapragada et al. ...... 725/138 |
| 2010/0085975 A1 * | 4/2010 | Wang et al. ............... 370/395.53 |
| 2011/0055572 A1 * | 3/2011 | Vogt et al. .................... 713/171 |

* cited by examiner

NETWORK STREAMING OVER MULTIPLE DATA COMMUNICATION CHANNELS USING CONTENT FEEDBACK INFORMATION

BACKGROUND

1. Field

The present disclosure generally relates to network streaming, and more specifically relates to network streaming from a sending endpoint to a receiving endpoint using content feedback information.

2. Description of the Related Art

In the field of data streaming in a network, there is a problem in that data streaming from a sending endpoint to a recipient endpoint may be detrimentally affected by limited network bandwidth, collisions in data transmission, and latency, which in turn affect the delivery quality of the streamed data. In the future, network bandwidth will invariably increase, which might suggest that this problem will become less significant in the future. In fact, however, recent history has shown that the quantity of data information that needs to be sent over networks grows much faster than the then-current delivery infrastructure, such that it is expected that the problem will persist. As the quantity of data information continues to increase (e.g., High Definition video streaming), an already overburdened system may provide less than adequate data delivery and/or playback quality, or may fail outright.

SUMMARY

The inventors herein have proposed arrangements that address this problem in a situation where the architecture of the network is such that the sender and the recipient both have multiple physical connections to the network, and/or in situations where there are multiple networks that connect the sender and recipient, and both the sender and recipient each have one or more physical connections to each network. For example, the sender and recipient might be connected over four separate networks including, such as, an Ethernet network, a MoCA (Multimedia over Coax Alliance) network, an Ethernet over powerline network, a HomePNA (Home Phoneline Networking Alliance) network, and/or a wireless network. For each network, both sender and recipient each have one or more physical connections to each network, such as twisted pair cable connecting to the Ethernet network, coaxial cable connecting to the MoCA network, power lines/ wires connecting to the Ethernet over powerline network, and one or more radio antennas connecting to the wireless network.

With such an architecture, the single data stream is split into sub-streams and sent over multiple physical interfaces which connect the endpoints of the network, instead of streaming data over only one of the possible physical interfaces. This arrangement is more flexible and resilient to network load or impairments because multiple physical interfaces are used simultaneously.

However, conditions within the network frequently change, which in turn may detrimentally affect the streaming of the data between endpoints, even though the data is streamed over multiple physical interfaces. For example, one or more of the physical interfaces which are used to send data may degrade or fail, such that the data sent over the degraded or failed physical interface(s) may be not received by the receiving endpoint in a timely manner, or may not be received at all.

In the present disclosure, the foregoing challenges are addressed by sending a single data stream from a sending endpoint to a receiving endpoint, wherein both of the sending endpoint and the receiving endpoint each have multiple data communication channels connecting the sending endpoint and the receiving endpoint to one or more networks, respectively. Sender content information is sent over one or more of the data communication channels from the sending endpoint to the receiving endpoint. Moreover, feedback information is sent from the receiving endpoint to the sending endpoint over one or more of the data communication channels. The feedback information is gathered for each of the data communication channels connected to the receiving endpoint. In addition, receiver content information gathered at the receiving endpoint is sent from the receiving endpoint to the sending endpoint over one or more of the data communication channels.

Thus, in an example embodiment described herein, different portions of the data packets are sent from the sending endpoint over different ones of the multiple data communication channels, and the data packets are received by the receiving endpoint. In addition, sender content information is sent by the sending endpoint over one or more of the data communication channels, and the sender content information is received by the receiving endpoint. Feedback information is then sent by the receiving endpoint over one or more of the data communication channels, and the feedback information is received by the sending endpoint. The feedback information is gathered for each of the data communication channels connected to the receiving endpoint. The feedback information includes, for example, network statistics that include increases and reductions in a data capacity throughput for each of the data communication channels. In addition, receiver content information gathered at the receiving endpoint is sent by the receiving endpoint over one or more of the data communication channels, and the receiver content information is received by the sending endpoint. The sender content information includes, for example, header information regarding data sent from the sending endpoint, network statistics and/or calculations derived from such network statistics. The receiver content information includes, for example, header information regarding data received at the receiving endpoint, network statistics and/or calculations derived from such network statistics.

Feedback information is also gathered by the sending endpoint for each of the data communication channels connected to the sending endpoint. The data packets are then reapportioned and sent from the sending endpoint over different ones of the multiple data communication channels, and the data packets are received by the receiving endpoint. The reapportionment is based at least partially on the feedback information gathered at the receiving endpoint, the sender content information, the receiver content information, and/or the feedback information gathered at the sending endpoint.

By virtue of the foregoing arrangement, it is ordinarily possible when sending data between endpoints of a network over multiple data communication channels, to minimize possible negative effects on a quality and efficiency of data delivery due to changing network conditions. More specifically, since content information gathered at the receiving endpoint, together with feedback information, is provided to the sending endpoint, an intelligent selection can be made as to which data communication channels are used to send and receive the data. Since the gathered feedback information includes feedback information with respect to each of the data communication channels, together with content information regarding the data stream, possible negative effects on a quality and efficiency of sent data may be substantially reduced. In particular, possible negative effects on a quality and efficiency of sent data may be substantially reduced because the data is sent using knowledge of the conditions on both the sending endpoint and the receiving endpoint, together with knowledge of the content of the data stream.

In an example embodiment also described herein, the sender content information regarding the data stream which is sent from the sending endpoint to the receiving endpoint is a first set of sender content information. Moreover, the first set of sender content information is sent over one of the multiple data communication channels. Then, a second set of sender content information regarding the streaming data is sent over a different one of the multiple data communication channels.

In another example embodiment described herein, when sending the sender content information regarding the streaming data, the sender content information is split and sent from the sending endpoint to the receiving endpoint over different ones of the multiple data communication channels. In one case, the sender content information sent from the sending endpoint to the receiving endpoint is a first set of sender content information. In this case, a second set of sender content information regarding the streaming data is split and sent from the sending endpoint to the receiving endpoint over multiple data communication channels, which are different than the ones of the multiple data communication channels on which the first set of sender content information was sent.

In yet another example embodiment described herein, the receiver content information sent from the receiving endpoint to the sending endpoint is a first set of receiver content information, and the first set of receiver content information is sent over one of the multiple data communication channels. A second set of receiver content information is then sent from the receiving endpoint to the sending endpoint over a different one of the multiple data communication channels.

In an additional example embodiment described herein, when sending the receiver content information from the receiving endpoint to the sending endpoint, the receiver content information is split and sent over different ones of the multiple data communication channels. In one case, the receiver content information sent from the receiving endpoint to the sending endpoint is a first set of receiver content information. A second set of receiver content information is then split and sent from the receiving endpoint to the sending endpoint over multiple data communication channels, which are different than the ones of the multiple data communication channels on which the first set of receiver content information was sent.

In another example embodiment described herein, the receiving endpoint includes a data combiner that combines data packets received at the receiving endpoint. In one situation, the data combiner inspects the data received at the receiving endpoint for protocol headers to gather the receiver content information. Alternatively, the data combiner may inspect the data output from the data combiner for protocol headers in order to gather the receiver content information. For example, the data combiner may inspect RTP protocol headers for timestamp or Frame ID information, which is used by the receiving endpoint to create statistics about data received from the network, such as transmission delay, data apportionment over each of the data communication channels, and data loss per data communication channel. In the case that the data combiner inspects the protocol headers for data output from the data combiner, the receiving endpoint can make certain additional calculations. The calculations may include, for example, improved or non-standard/proprietary jitter calculations, or jitter calculations related to each receiver data communication channel and/or compared to a jitter calculation for an overall combined output. Such data pertaining to each of the data communication channels of the receiving endpoint may not easily be gathered through feedback information. Thus, the data stream content header information provides enhanced network statistics regarding the individual and aggregated data communication channels.

In an additional example embodiment described herein, the data combiner inspects the data received at the receiving endpoint for media format (e.g., MPEG 2, MPEG 4, etc.) headers to gather the receiver content information. For example, the data combiner may inspect the media format headers of the streaming data to extract information such as stream bit rate, frame rate, frame boundaries, and sequence/frame numbering information. In other example embodiments, the data combiner may inspect the data received at the receiving endpoint for protocol headers, as well as media format headers included in the received data.

In yet another example embodiment described herein, the sender content information sent from the sending endpoint to the receiving endpoint is sent as a sender report. In addition, the receiver content information sent from the receiving endpoint to the sending endpoint is sent as a receiver report. The sender report and the receiver report may be, for example, reports provided by RTCP. In some cases, the receiver report and the sender report are extended to include additional information to be processed by the sending endpoint and the receiving endpoint, respectively. More specifically, a receiving application at the receiving endpoint adds the additional information to the receiver report, and a sending application at the sending endpoint adds the additional information to the sender report. In this case, the receiving application and the sending application are modified to include the additional information in the reports. The additional information may include the statistics and customized calculations described above.

In an additional example embodiment described herein, the receiver report is intercepted by a bondable virtual interface included at the receiving endpoint, and the bondable virtual interface at the receiving endpoint adds the additional information to the receiver report. In addition, the sender report is intercepted by a bondable virtual interface included at the sending endpoint, and the bondable virtual interface included at the sending endpoint adds the additional information to the sender report. In this example embodiment, each of the applications included in the sending endpoint and the receiving endpoint are unaware of the additional information included in the sender report and the receiver report.

In yet an additional example embodiment described herein, a bondable virtual interface included at the sending endpoint creates a spoof sender report to replace, or be sent in addition to, the sender report. The spoof sender report includes additional information to be processed by the receiving endpoint. Moreover, a bondable virtual interface included at the receiving endpoint creates a spoof receiver report to replace, or be sent in addition to, the receiver report. The spoof receiver report includes additional information to be processed by the sending endpoint.

In other example embodiments described herein, the sending of the different portions of data packets from the sending endpoint to the receiving endpoint over different ones of the multiple data communication channels is based at least partially on a data capacity throughput for each of the multiple data communication channels.

This brief summary has been provided so that the nature of the disclosure may be understood quickly. A more complete

DETAILED DESCRIPTION

Figure 1:
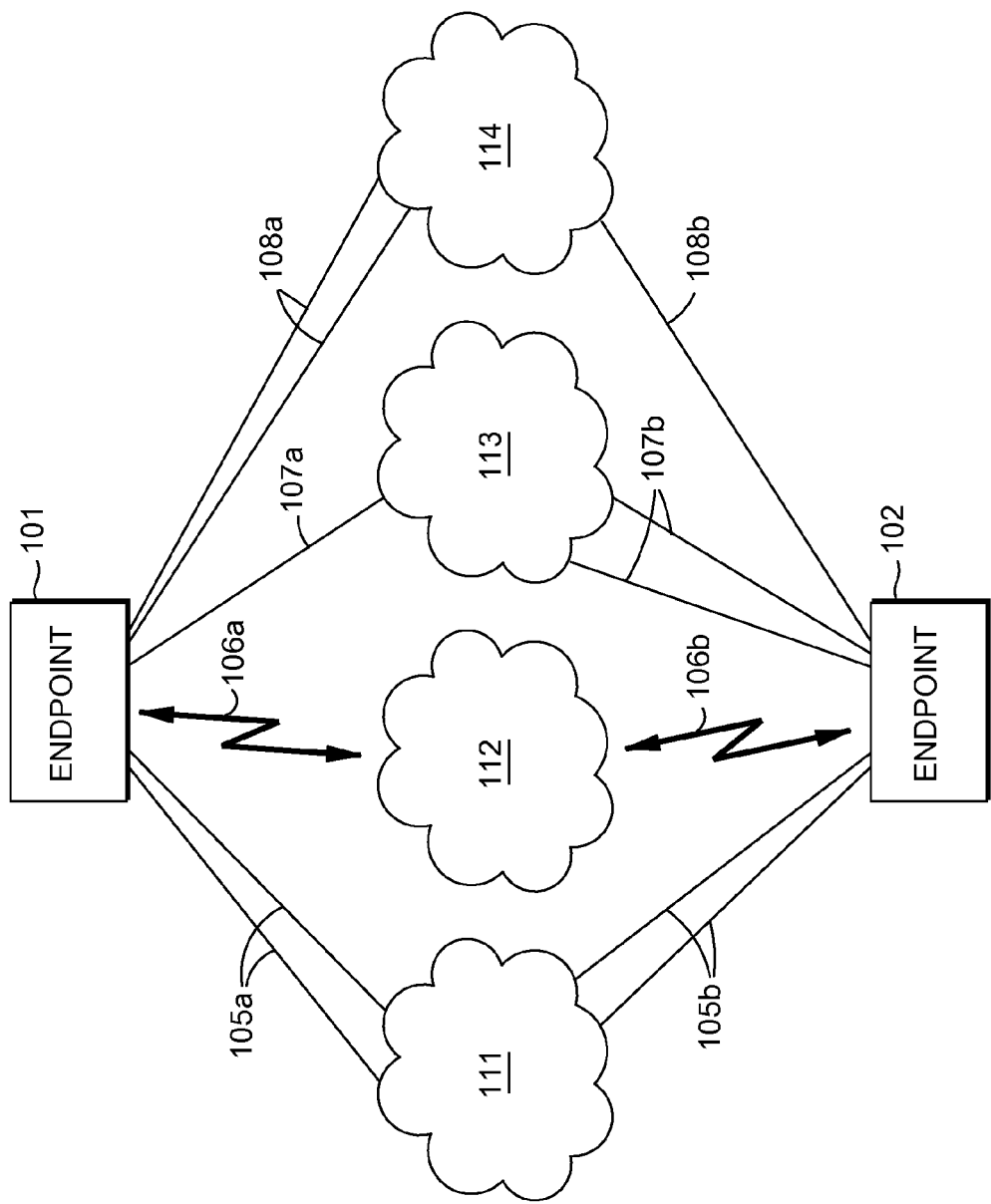
FIG. 1 is a representative view of a sending endpoint and a receiving endpoint, connected via networks, on which an architecture of an example embodiment may be implemented.

FIG. 1 is a representative view of a sending endpoint and a receiving endpoint, connected via multiple networks, on which an architecture of an example embodiment may be implemented. As shown in FIG. 1, sending endpoint 101 is connected to receiving endpoint 102 through networks 111, 112, 113 and 114. The networks may include similar or dissimilar networks, mixed in any combination, as described below. Sending endpoint 101 includes multiple physical interfaces, including at least one or more physical interface for each different network. As shown in the example of FIG. 1, sending endpoint 101 includes physical interfaces 105*a*, 106*a*, 107*a* and 108*a*. More specifically, sending endpoint 101 has physical interfaces 105*a* which connect sending endpoint 101 to network 111. In FIG. 1, sending endpoint 101 is shown to have two physical interfaces 105*a* connecting to network 111; however, in other embodiments, sending endpoint 101 may have a single physical interface connecting to network 111, or may have more than two physical interfaces connecting to network 111.

Receiving endpoint 102 also has multiple physical interfaces 105*b* connecting to network 111. Similar to sending endpoint 101, receiving endpoint 102 may also have a single or multiple physical interfaces connecting to network 111. As a result of the physical interface connections, sending endpoint 101 is connected to receiving endpoint 102 through network 111, using physical interfaces 105*b*. Each of the multiple physical interfaces 105*a* and 105*b* to 108*a* and 108*b* include one or more data communication channels (not shown). For example, each of the multiple physical interfaces may include, for example, multiple ports on which data may be sent, and more particularly, each of the multiple physical interfaces may include a port for audio and a port for video.

Similar to the above-described connection between sending endpoint 101 and receiving endpoint 102, sending endpoint 101 and receiving endpoint 102 are connected through networks 112, 113 and 114 via physical interfaces 106*a* and 106*b*, 107*a* and 107*b* and 108*a* and 108*b*. Accordingly, sending endpoint 101 is connected to network 112 through one or more physical interfaces 106*a*; and, receiving endpoint 102 is connected to network 112 through one or more physical interfaces 106*b*. Sending endpoint 101 is connected to network 113 through one or more physical interfaces 107*a*; and, receiving endpoint 102 is connected to network 113 through one or more physical interfaces 107*b*. Lastly, sending endpoint 101 is connected to network 114 through one or more physical interfaces 108*a*; and, receiving endpoint 102 is connected to network 114 through one or more physical interfaces 108*b*. In FIG. 1, sending endpoint 101 and receiving endpoint 102 are shown to be connected through four networks; however, sending endpoint 101 and receiving endpoint 102 may be connected through more or less networks. In this regard, the number of networks is established by a user's demands, or is established by an already existing infrastructure connecting the two endpoints.

Networks 111, 112, 113 and 114 can be many different types of networks, for example, an Ethernet network, a Multimedia over Coax Alliance (MoCA) network, a HomePNA (Home Phoneline Networking Alliance) network, an Ethernet over powerline network (HomePlug), a wireless network, or any other type of network. In addition, the networks connecting the two endpoints can all be a different type of network (e.g., network 111 can be an Ethernet network, while network 112 is a wireless network, network 113 is an Ethernet over powerline network, and network 114 is a MoCA network). On the other hand, the networks connecting the two endpoints can include any variety of combinations of different networks (e.g., network 111 can be a MoCA network, while network 112 is a wireless network, and networks 113 and 114 are Ethernet networks). The type of physical interfaces connecting the endpoints to the networks depends upon the type of network. For example, an endpoint may be connected to an Ethernet network through twisted pair cable, an endpoint may be connected to a MoCA network through coaxial cable, an endpoint may be connected to an Ethernet over powerline network over power lines/wires, and an endpoint may be connected to a wireless network over one or more radio antennas.

The sending endpoint 101 serves as an application sender, which may include, for example, a media server, a conference server, or a storage sender application. A media server is an endpoint that will transfer audio and video data (or other types of large data) to a client. Although the media server is specific to transferring video streams, other types of media servers can be substituted (e.g., an audio-only stream or a large archival stream). The media server may also be a modified third party application accessing the sending endpoint 101. A conference server is an endpoint that sends data (via Unicast or Multicast) to conference players, and is used in providing interactive conference content to participants. A storage sender application is an endpoint that sends data from a device to a receiver, and is used in transferring data between two endpoints (e.g., File Transfer Protocol (FTP)). The storage sender application is primarily used in a PC collaboration as a means to send device data to be stored at an external storage medium.

The receiving endpoint 102 serves as an application receiver, which may include, for example, a media client or media player, a conference player, or a storage receiver application. A media client or media player is an endpoint that receives data from a media server, and is used primarily for video and audio stream playing. A conference player is an endpoint that receives data from the conference server, and is used in playing and interacting within a conference. A storage receiver application is an endpoint that receives data from a storage sender application, and is used in transferring data between two endpoints (e.g., FTP). The storage application receiver is primarily used in a PC collaboration as a means to receive device data to be stored at an external storage medium.

In some instances, a sending endpoint may also simultaneously act as a receiving endpoint. For example, when a sending endpoint serves as a video conferencing application, video would stream from the sending endpoint to the receiving endpoint, and video would stream simultaneously from the receiving endpoint to the sending endpoint. In this example, the sending endpoint would also be acting as a receiving endpoint, and the receiving endpoint would also be acting as a sending endpoint. In other instances, a sending endpoint may become a receiving endpoint after some period of time. For example, a sending endpoint and a receiving endpoint might transfer data back and forth to each other in a ping-pong fashion, rather than simultaneously. In other words, the sending endpoint might complete a transfer of data to the receiving endpoint, and then a second transfer may begin in the opposite direction from the receiving endpoint to the sending endpoint.

In this example embodiment, each of the physical interfaces 105a and 105b to 108a and 108b described above use one or more ports. For example, one of the physical interfaces may use two ports, namely, a first port for sound and a second port for video.

Figure 2:
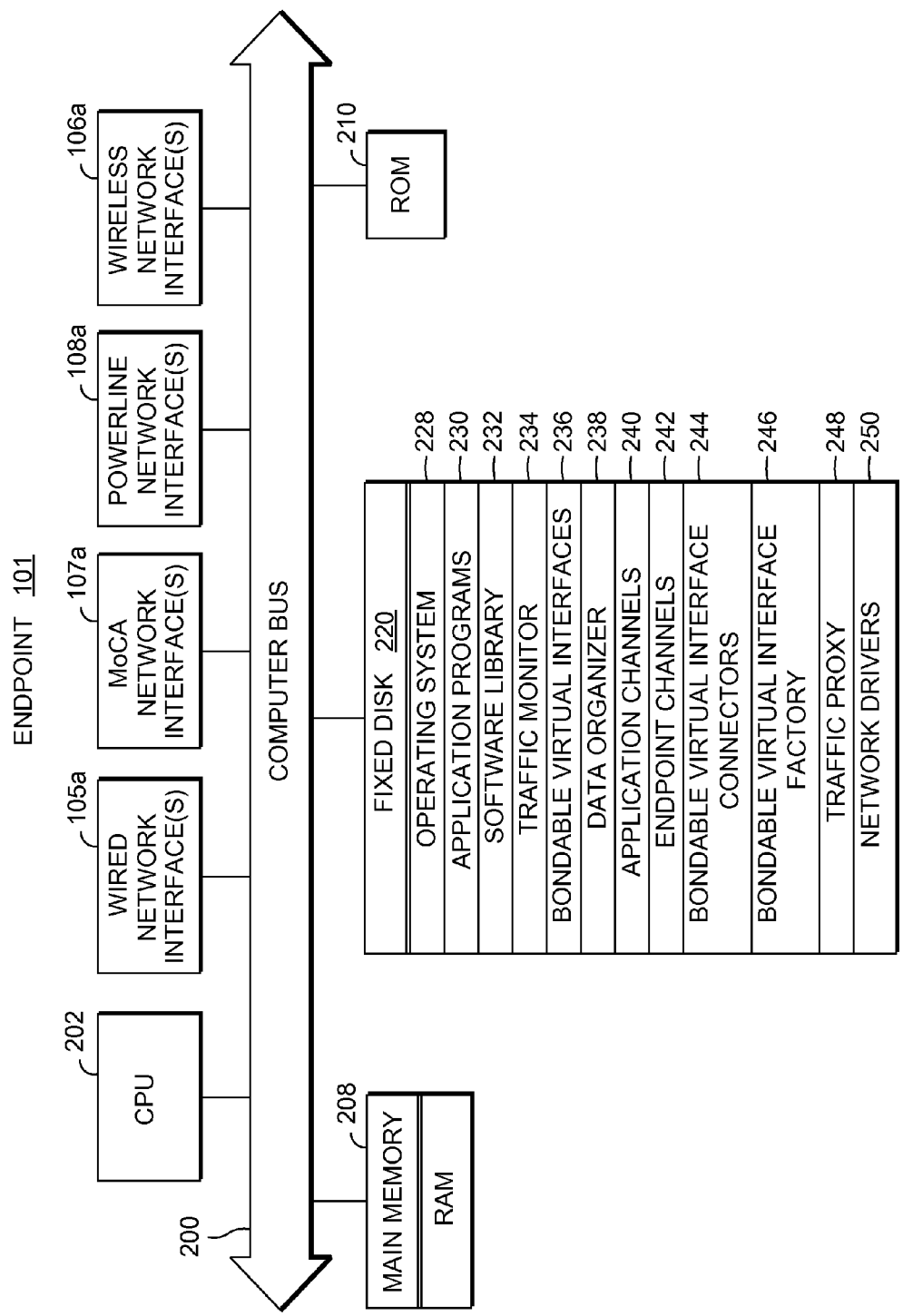
FIG. 2 is a detailed block diagram for explaining the internal architecture of the sending endpoint of FIG. 1.

FIG. 2 is a detailed block diagram for explaining the internal architecture of the sending endpoint 101 of FIG. 1. As shown in FIG. 2, sending endpoint 101 includes central processing unit (CPU) 202 which interfaces with computer bus 200. Also interfacing with computer bus 200 are hard (or fixed) disk 220, wired network interface(s) 105a, wireless network interface(s) 106a, MoCA network interface(s) 107a, powerline network interface(s) 108a, random access memory (RAM) 208 for use as a main run-time transient memory, and read only memory (ROM) 210.

RAM 208 interfaces with computer bus 200 so as to provide information stored in RAM 208 to CPU 202 during execution of the instructions in software programs such as an operating system, application programs, and interface drivers. More specifically, CPU 202 first loads computer-executable process steps from fixed disk 220, or another storage device into a region of RAM 208. CPU 202 can then execute the stored process steps from RAM 208 in order to execute the loaded computer-executable process steps. In addition, data such as gathered network performance statistics or other information can be stored in RAM 208, so that the data can be accessed by CPU 202 during the execution of computer-executable software programs, to the extent that such software programs have a need to access and/or modify the data.

As also shown in FIG. 2, hard disk 220 contains operating system 228, application programs 230 such as programs for starting up and shutting down the sending endpoint 101 or other programs. Hard disk 220 further contains software library 232 for controlling the sending of data from sending endpoint 101. Hard disk 220 also contains traffic monitor 234 for gathering performance statistics for each of the multiple physical interfaces 105a, 106a, 107a and 108a. In addition, hard disk 220 contains bondable virtual interfaces 236, data organizer 238, application channels 240, endpoint channels 242, bondable virtual interface connectors 244, bondable virtual interface factory 246, and traffic proxy 248, each of which is instantiated by the software library 232 and will be described in more detail below with reference to FIGS. 4 and 5. Traffic proxy 248 may be used as a communication interface between the software library 232 and the traffic monitor 234. Lastly, hard disk 220 contains network drivers 250 for software interface to networks such as networks 111, 112, 113 and 114.

In an example embodiment, software library 232 and traffic monitor 234 are loaded by CPU 202 into a region of RAM 208. CPU 202 then executes the stored software library 232 and the traffic monitor 234 from RAM 208 in order to execute the loaded computer-executable steps. In addition, application programs 230 are loaded by CPU 202 into a region of RAM 208. CPU 202 then executes the stored process steps as described in detail below in connection with FIG. 7, in order to execute the loaded computer-executable steps.

Figure 3:
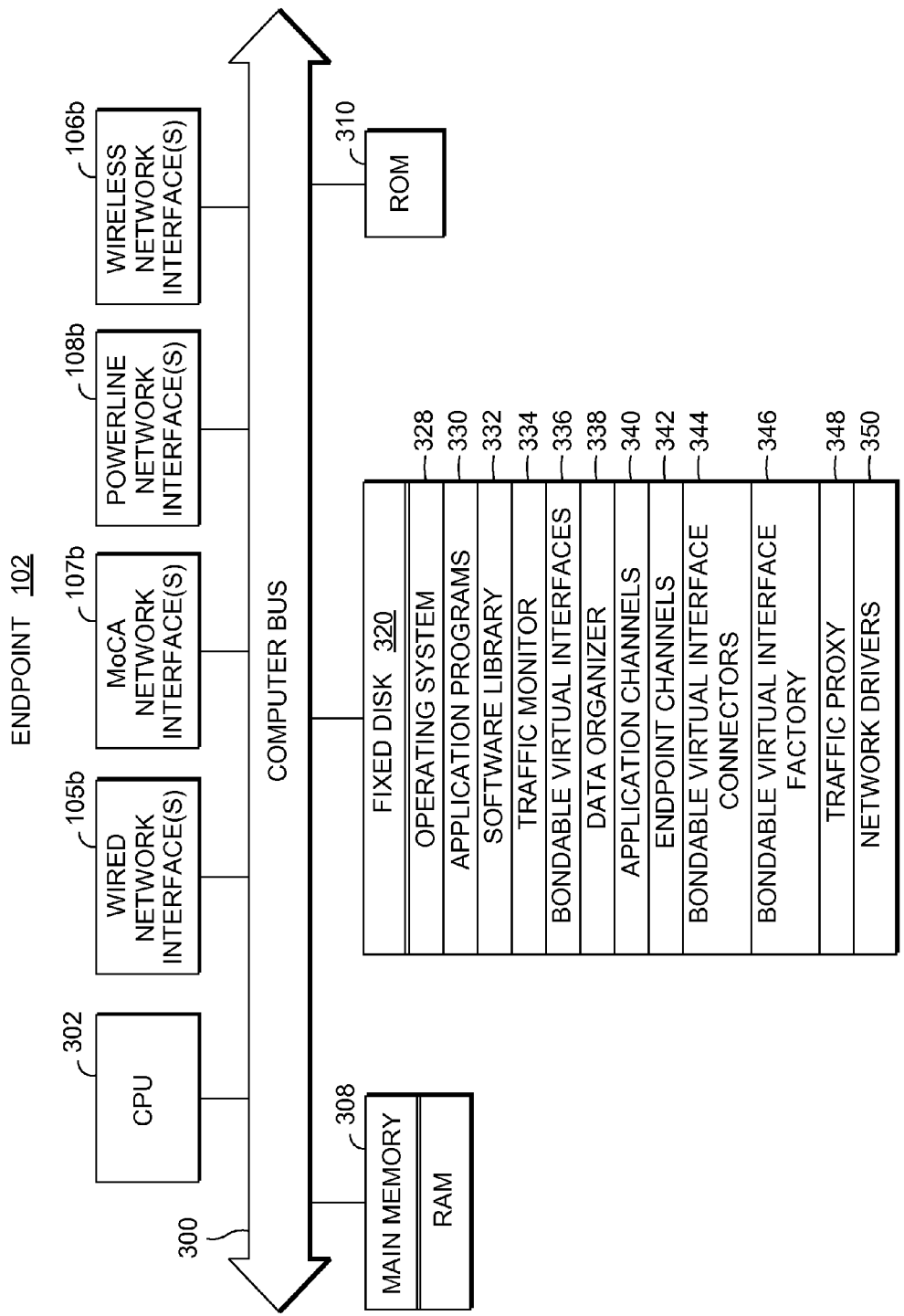
FIG. 3 is a detailed block diagram for explaining the internal architecture of the receiving endpoint of FIG. 1.

FIG. 3 is a detailed block diagram for explaining the internal architecture of the receiving endpoint 102 of FIG. 1. As shown in FIG. 3, receiving endpoint 102 includes central processing unit (CPU) 302 which interfaces with computer bus 300. Also interfacing with computer bus 300 are hard (or fixed) disk 320, wired network interface(s) 105b, wireless network interface(s) 106b, MoCA network interface(s) 107b, powerline network interface(s) 108b, random access memory (RAM) 308 for use as a main run-time transient memory, and read only memory (ROM) 310.

RAM 308 interfaces with computer bus 300 so as to provide information stored in RAM 308 to CPU 302 during execution of the instructions in software programs such as an operating system, application programs, and interface drivers. More specifically, CPU 302 first loads computer-executable process steps from fixed disk 320, or another storage device into a region of RAM 308. CPU 302 can then execute the stored process steps from RAM 308 in order to execute the loaded computer-executable process steps. In addition, data such as gathered network performance statistics or other information can be stored in RAM 308, so that the data can be accessed by CPU 302 during the execution of computer-executable software programs, to the extent that such software programs have a need to access and/or modify the data.

As also shown in FIG. 3, hard disk 320 contains operating system 328, application programs 330 such as programs for starting up and shutting down the receiving endpoint 102 or other programs. Hard disk 320 further contains software library 332 for controlling the receiving of data from receiving endpoint 102.

Software library 332 in this example is identical to software library 232 in sending endpoint 101. However, in other embodiments, the software library 332 need not be identical to library 232, so long as the two libraries implement a similar software architecture relative to the software library, the traffic monitor, the bondable virtual interfaces, and the data organizer. For example, the sending and receiving endpoints might implement different versions of the same software architecture. Or the sending and receiving endpoints might implement architecture that target different operating systems, such as Windows on the sending endpoint and Linux on the receiving endpoint. Or, the sending endpoint and the receiving endpoint might implement architecture that is OS-neutral like JAVA. Hard disk 320 also contains traffic monitor 334 for gathering performance statistics for each of the multiple physical interfaces 105b, 106b, 107b and 108b. In addition, hard disk 320 contains bondable virtual interfaces 336, data organizer 338, application channels 340, endpoint channels 342, bondable virtual interface connectors 344, bondable virtual interface factory 346, and traffic proxy 348, each of which is instantiated by the software library 332 and will be described in more detail below with reference to FIGS. 4 and 5. Traffic proxy 348 may be used as a communication interface between the software library 332 and the traffic monitor

334. Lastly, hard disk 320 contains network drivers 350 for software interface to networks such as networks 111, 112, 113 and 114.

In an example embodiment, software library 332 and traffic monitor 334 are loaded by CPU 302 into a region of RAM 308. CPU 302 then executes the stored process steps of the software library 332 and the traffic monitor 334 from RAM 308 in order to execute the loaded computer-executable steps. In addition, the process steps of the application programs 330 are loaded by CPU 302 into a region of RAM 308. CPU 302 then executes the stored process steps as described in detail below in connection with FIG. 8, in order to execute the loaded computer-executable steps.

General Description of Architecture

Transferring data between two endpoints in an efficient manner is difficult. Efficiency can be improved in general by increasing the amount of information concerning the nature of the transfer. For example, efficiency can be improved with an understanding of how to send data between two endpoints and also an understanding of the type of data being sent. Further, by identifying multiple physical interfaces and combining them together into one physical interface (i.e., bondable virtual interface), data throughput may be improved.

In a simplistic architecture, a media receiver/player requests (via e.g., HTTP or RTSP) for a movie stream from a media server. The media server then sends data to the client with some, but probably little concern as to the means or how well the client may have received the media stream data. In contrast, within the architecture of this example embodiment, the media client provides profile information (i.e., a suggested or predetermined bondable virtual interface configuration) as to the type of the media to be streamed, and negotiates with the media server as to the physical interfaces available to exchange data. With this knowledge of media type, both the sending and receiving buffer can be modified to improve throughput. The negotiation between the media client and the media server produces a configuration and setup for multiple physical interfaces via negotiation. In a case where there are multiple logical physical interfaces, the creation of a combined (or bondable virtual interface) physical interface will occur. In this regard, a bondable virtual interface is a combination of physical interfaces that can send data via multiple physical interfaces. Further, feedback information will be sent between both endpoints to improve throughput. The media client then receives the segments on the multiple physical interfaces, recombines the segments and provides the data to the media client's player (whether included in the media client or connected to the media client). Using this architecture makes it possible to ordinarily improve throughput by: (1) Sending information back to the endpoint regarding, for example, changes to the data stream or processing of the data, which improves the efficiency of buffer management, and (2) using a bondable virtual interface which increases throughput of data by using multiple physical interfaces to send the data.

Figure 4:
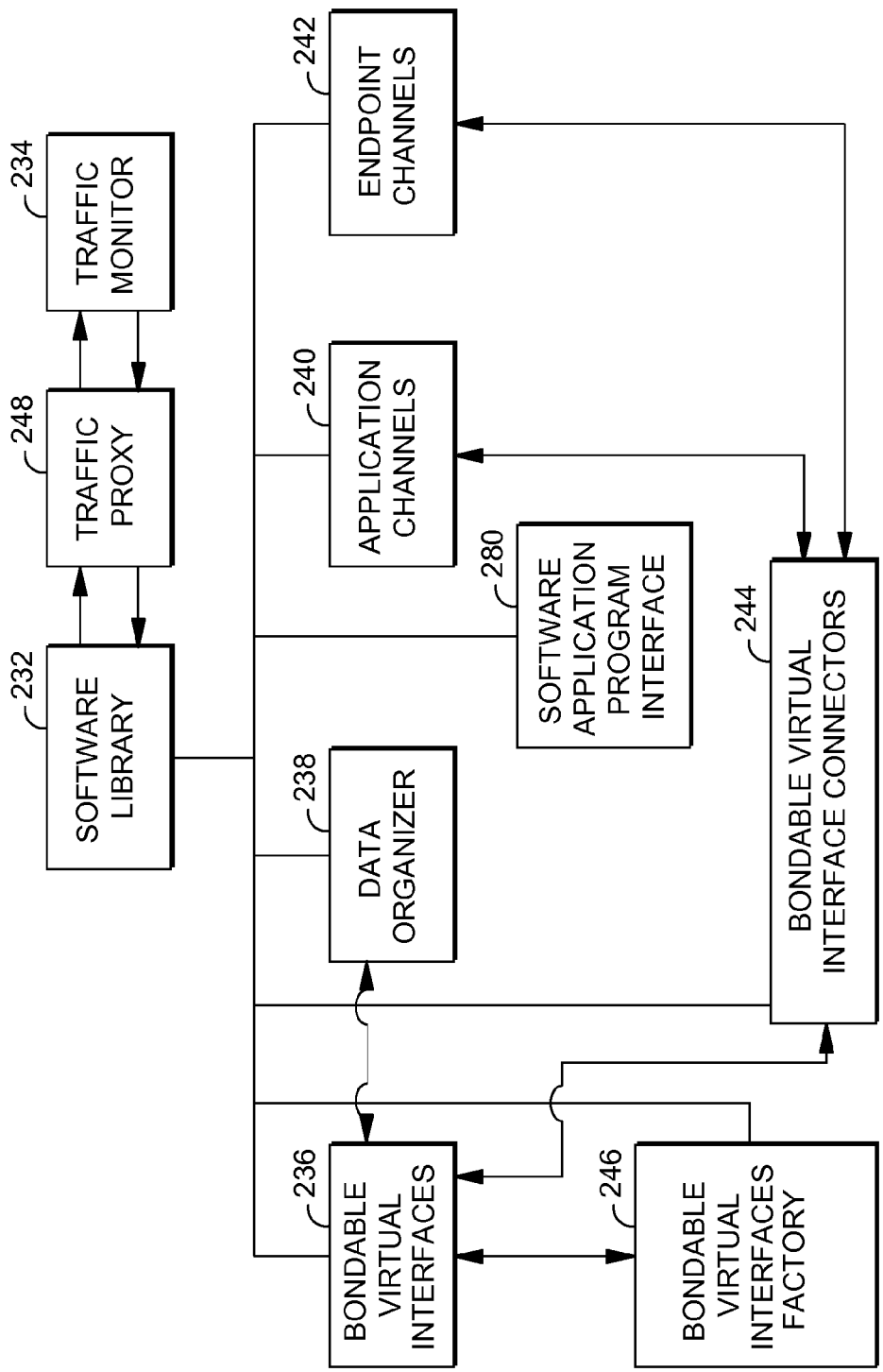
FIG. 4 is a high level view of an architecture according to an example embodiment.

FIG. 4 is a high level view of an architecture according to an example embodiment. As shown in FIG. 4, the architecture includes software library 232 and traffic monitor 234. The software library 232 is connected to and communicates with the traffic monitor 234 through traffic proxy 248. In this regard, the software library 232 instantiates and associates with the traffic monitor 234 via the traffic proxy 248. However, the traffic proxy 248 may be omitted, and the software library 232 and the traffic monitor 234 may communicate with each other directly.

As used herein, the word "instantiate" refers to the construction in memory of a software object, such as by use of an object factory. How the software object is created varies among different programming languages. In prototype-based languages, an object can be created from nothing, or an object can be based on an existing object. In class-based language, objects are derived from classes, which can be thought of as blueprints for constructing the software objects.

As further shown in FIG. 4, the software library 232 is connected to bondable virtual interfaces 236, bondable virtual interface factory 246, data organizer 238, software application program interface 280, application channels 240, and endpoint channels 242. In this regard, the software library 232 instantiates and associates with the bondable virtual interfaces 236, the bondable virtual interface factory 246, the data organizer 238, the software application program interface 280, the application channels 240, and the endpoint channels 242. In addition, the data organizer 238 instantiates a data splitter or a data combiner (both of which are described below in detail in connection with FIG. 5), depending on whether the architecture is implemented on a sending endpoint or a receiving endpoint. The foregoing mentioned components will be described, including their use and functionality, in more detail below in connection with FIG. 5.

Furthermore, the bondable virtual interface factory 246 is connected to and associates with the bondable virtual interfaces 236. The bondable virtual interfaces 236 are also connected to and associate with the data organizer 238 and the bondable virtual interface connectors 244. The bondable virtual interface connectors 244 also associate with application channels 240 and endpoint channels 242.

Figure 5:
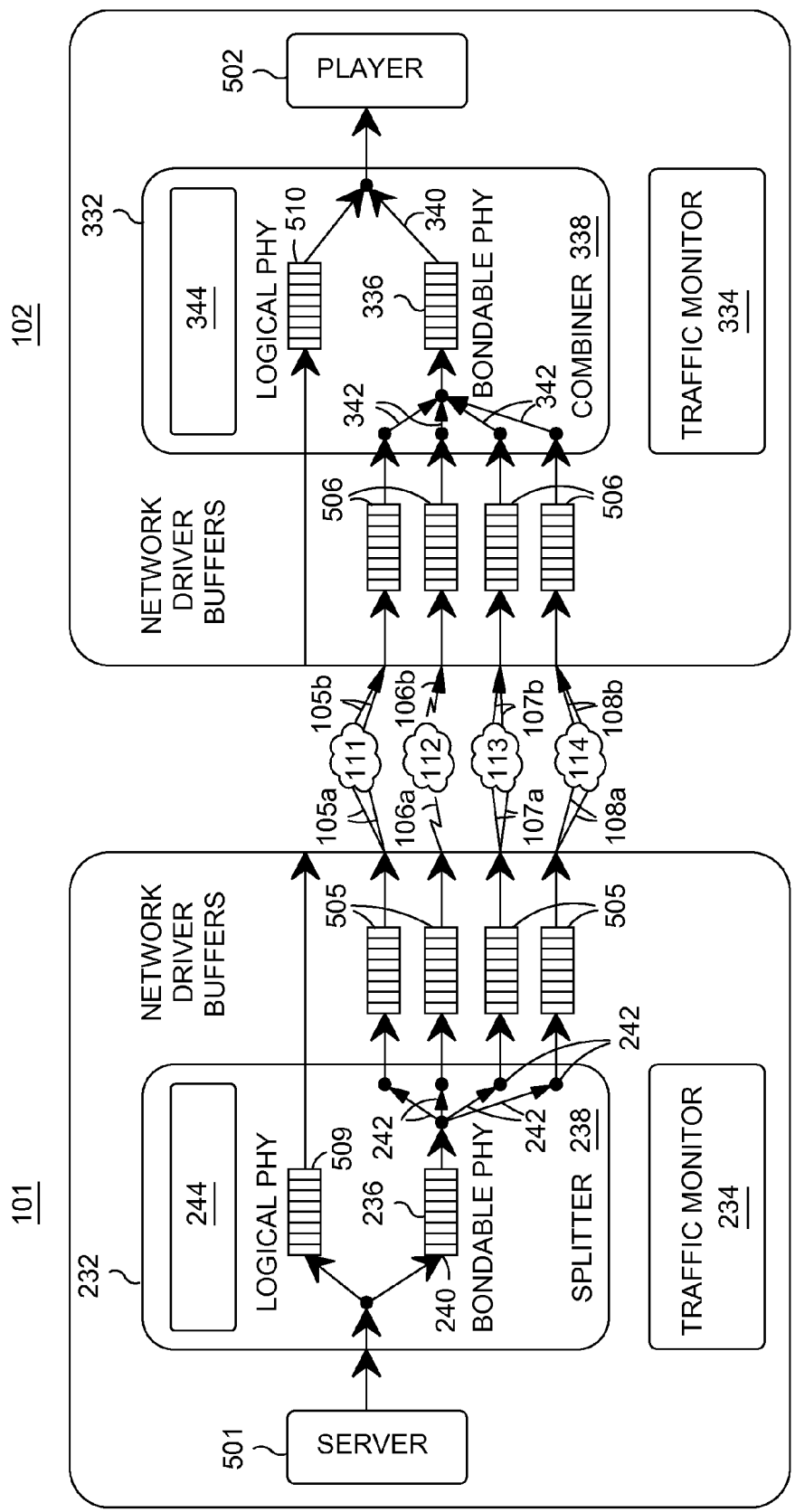
FIG. 5 is another view of a sending endpoint and a receiving endpoint, for providing a general explanation of an example embodiment.

The above-mentioned architecture will now be described in more detail in connection with FIG. 5. FIG. 5 is another view of the sending endpoint 101 and the receiving endpoint 102 shown in FIG. 1, for providing an explanation of an example embodiment of the architecture included in both endpoints. As discussed above in connection with FIG. 1, the architecture is for streaming data from a sending endpoint 101 to a receiving endpoint 102 which are connected to each other by multiple networks (111, 112, 113, 114 of FIG. 1). Each of the sending endpoint 101 and the receiving endpoint 102 has multiple physical interfaces (105*a* and *b*, 106*a* and *b*, 107*a* and *b* and 108*a* and *b* of FIG. 1), each for interfacing to a respective one of the multiple networks. The architecture for controlling the streaming of the data is implemented on both the sending endpoint 101 and the receiving endpoint 102.

As shown in FIG. 5, the architecture on the sending endpoint 101 includes a software library 232 and a traffic monitor 234. The traffic monitor 234 is for gathering performance characteristics of each of the multiple physical interfaces. More specifically, the traffic monitor 234 is an operating system-specific application or (daemon) service that provides the software library 232 with all of the available physical interfaces, and with individual physical interface performance/traffic statistics and data. The traffic monitor 234 may obtain network status by periodically making system calls to system's data structures to acquire statistics for each physical interface of the sending endpoint 101. This data is then used by the traffic monitor 234 to specify corresponding configurations for bondable virtual interfaces, which will be described in more detail below, including a list of suitable known bondable virtual interfaces that can be used to transfer data based on current network traffic. The traffic monitor 234 communicates information back and forth between the software library 232. As shown in FIG. 5, the traffic monitor 234 communicates directly with the software library 232; however, in other embodiments, the traffic monitor 234 can communicate with the software library 232 via traffic proxy 248 as described above in connection with FIG. 4.

The software library 232 is for controlling the sending of the data stream from the sending endpoint 101. In controlling the sending of data, the software library 232 instantiates a plurality of bondable virtual interfaces 236 and a data organizer 238. In addition, the software library 232 instantiates logical physical interfaces 509. The logical physical interface 509 is an abstraction of a physical interface, which has a uniform interface. In addition, the bondable virtual interfaces 236 are instantiated by the software library based on the information communicated by the traffic monitor 234, for splitting the data stream into multiple data substreams at the sending endpoint 101. A bondable virtual interface is a clustering of two or more logical physical interfaces as a bondable object that aggregates available bandwidth with a single thread to manage a common buffer memory. The bondable virtual interface has a second thread to listen to a single feedback path from the receiving endpoint 102, and has additional threads for managing data transfer from a common buffer memory to each of an associated logical physical interface. An example of a bondable virtual interface is a pair of 802.11g wireless interfaces combined for a nominal available bandwidth of 44 Mb/s, assuming ~22 Mb/s of effective bandwidth for each individual interface.

In addition, the data organizer is used for designating one of the plurality of bondable virtual interfaces 236 for splitting the data stream. At the sending endpoint 101, the data organizer 238 instantiates a data splitter 238 for implementing the designated one of the plurality of bondable virtual interfaces 236 at the sending endpoint 101. In this regard, the data organizer 238 is a parent object for the data splitter, and includes functionality for the registration of new or added bondable virtual interfaces. Moreover, the data organizer 238 is inherited by the data splitter 238. The data splitter 238 contains the bondable virtual interfaces 236 class implementation, and contains the associated behavior for splitting the input data stream onto the multiple physical interfaces.

Similar to the sending endpoint 101, in the receiving endpoint 102, the architecture includes a software library 332 and a traffic monitor 334. The traffic monitor 334 is for gathering performance characteristics of each of the multiple physical interfaces. More specifically, the traffic monitor 334 is an operating system-specific application or (daemon) service that provides the software library 332 with all of the available physical interfaces and with individual physical interface performance/traffic statistics and data. The traffic monitor 334 may obtain network status by periodically making system calls to system's data structures to acquire statistics for each physical interface of the receiving endpoint 102. This data is then used by the traffic monitor 334 to specify corresponding configurations for bondable virtual interfaces, which will be described in more detail below, including a list of suitable known bondable virtual interfaces that can be used to transfer data based on current network traffic. The traffic monitor 334 communicates information back and forth between the software library 332. In FIG. 5, the traffic monitor 334 communicates directly with the software library 332; however, in other embodiments, the traffic monitor 334 can communicate with the software library 332 via a traffic proxy as described above in connection with FIG. 4.

The software library 332 is for controlling the receiving of the data stream at the receiving endpoint 102. In controlling the receiving of data, the software library 332 instantiates a plurality of bondable virtual interfaces 336 and a data organizer 338. In addition, the software library 332 instantiates logical physical interfaces 510. The logical physical interfaces 510 are substantially the same as logical physical interfaces 509, and provide the same functions. The bondable virtual interfaces 336 are instantiated by the software library based on the information communicated by the traffic monitor 334, for combining the multiple data sub-streams into the data stream at the receiving endpoint 102. In addition, the data organizer is for designating one of the plurality of bondable virtual interfaces 236 for combining the data stream.

At the receiving endpoint 102, the data organizer 338 instantiates a data combiner 338 for implementing the designated one of the plurality of bondable virtual interfaces 336 at the receiving endpoint 102. In this regard, the data combiner 338 is a parent object for the data combiner 338, and includes functionality for the registration of new or added bondable virtual interfaces. Moreover, the data organizer 338 is inherited by the data combiner 338. The data combiner 338 contains the bondable virtual interfaces 336 class implementation, and contains the associated behavior for combining multiple input streams into a resulting single data stream.

At startup of the architecture, the data splitter 238 and the data combiner 338 read network statistics provided by the traffic monitor 234 and 334. The traffic monitors' network statistics are updated periodically (at optionally application specified intervals), and are organized to display an ordered list of recommended bondable physical interface configurations, along with a minimum bandwidth available for each.

As further shown in FIG. 5, the sending endpoint 101 and the receiving endpoint 102 are each connected to one or more applications, such as application server 501 and application player 502, respectively. In this regard, the software library 232 of the sending endpoint 101 and the software library 332 of the receiving endpoint 102 further instantiate one or more application channels 240 and 340, respectively, connecting the software libraries 232 and 332 to one or more applications 501 and 502, respectively. The one or more application channels 240 write data to the software library 232, the written data having been received by the sending endpoint 101 from the one or more applications 501. In addition, the one or more application channels 340 read data from the software library 332, the read data having been sent from the receiving endpoint 102 to the one or more applications 502 connected to the receiving endpoint 102. For the application channels, a "named-socket" can be used, which provides a very similar interface to the traditional "single socket" approach in common usage. Moreover, the one or more application channels 240 and 340 include an event handling mechanism to indicate when there is data to be read from or written to the software libraries 232 and 332. The event handling mechanism for a named-socket is a select; however, many other means can be used for triggering events on the application channels.

As shown in FIG. 5, the software libraries 232 and 332 further instantiate multiple endpoint channels 242 and 342, respectively, connecting the software libraries 232 and 332 to the multiple physical interfaces 105a to 108a and 105b to 108b through network driver buffers 505 and 506. The multiple endpoint channels 242 and 342 write data to the software library 332, the written data having been received at the receiving endpoint 102 from the sending endpoint 101, and read data from the software library 232, the read data having been sent from the sending endpoint 101 to the receiving endpoint 102. The multiple endpoint channels 242 and 342 include an event handling mechanism to indicate when there is data to be read from or written to the multiple physical interfaces 105a and 105b to 108a and 108b. In addition, the network driver buffers 505 and 506 are provided to store data before sending data on the sending side, and before reconstructing the data stream and providing the single data stream to the application player 502 on the receiving side. In general, for the multiple endpoint channels, UDP and/or TCP sockets are used to write and read data to/from a network. Moreover, the event handling mechanism for the endpoint channels can be a select; however, other means for triggering events on the endpoint channels may be used. Lastly, an endpoint channel usually has an associated physical interface (e.g., an Ethernet socket); however, other instances exist in which this is not the case. For example, the case exists of using one physical interface but using multiple ports (e.g., using 2 sockets using IP address 192.168.10.1 port 10000 and port 10001).

The bondable virtual interfaces 236 and 336, as shown in FIG. 5, are created by the data splitter 238 or the data combiner 338 to perform the splitting or combining of the data stream. The bondable virtual interfaces 236 and 336 conform to an interface, which allows them to be used generically in the framework. In other words, one bondable virtual interface could be substituted with another bondable virtual interface quite easily without changing any interface requirements elsewhere in the software library, or in an application. Lastly, a bondable virtual interface can have multiple physical interfaces associated with it, or a bondable virtual interface can have a single logical physical interface (as is the case with sockets using one physical interface but with multiple ports).

In addition, the bondable virtual interfaces 236 and 336 have the basic functionality to split or combine data (based upon the role provided by the data splitter 238 or the data combiner 338). In general, the bondable virtual interfaces may be a reduction of a number or a set of rules regarding how to handle data from one or more application channels split over one or more endpoint channels (or vice versa, when recombining data). Thus, different types of bondable virtual interfaces may be created. Two examples of such bondable virtual interfaces are: a simple TCP Bondable virtual interface, and a simple UDP bondable virtual interface. A simple TCP bondable virtual interface is a bondable virtual interface consisting of multiple physical network interfaces, sending data with each interface using standard TCP connections. An example of a simple TCP bondable virtual interface would be a "round robin" type bondable virtual interface, which uses multiple interfaces to send data.

A simple UDP bondable virtual interface is a bondable virtual interface comprising multiple physical network interfaces, and sending data with each interface using standard UDP datagrams.

When designating ones of the plurality of bondable virtual interfaces 236 and 336, the data splitter 238 and the data combiner 338 negotiate to designate one of the bondable virtual interfaces, based on the performance characteristics of the multiple physical interfaces 105a to 108a and 105b to 108b and available ones of the plurality of bondable virtual interfaces. During the negotiation between the data splitter 238 and the data combiner 338, the data splitter 238 presents available ones of the plurality of bondable virtual interfaces, and the data combiner 338 selects one of the available ones of the plurality of bondable virtual interfaces.

Furthermore, the software libraries 232 and 332 further instantiate a plurality of bondable virtual interface connectors 244 and 344, respectively. Each bondable virtual interface connector is associated with a specific bondable virtual interface. The bondable virtual interface connectors 244 and 344 ensure that the connections between the software libraries 232 and 332 and the multiple physical interfaces 105a to 108a and 105b to 108b via the multiple endpoint channels 242 and 342, respectively, are ready to accept data before sending data from the sending endpoint 101 to the receiving endpoint 102. In addition, the bondable virtual interface connectors 244 and 344 ensure that the connections between the software libraries 232 and 332 and the one or more applications 501 and 502 via the one or more application channels 240 and 340, respectively, are ready to accept data before sending data from the sending endpoint 101 to the receiving endpoint 102.

When sending streaming data from the sending endpoint 101 to the receiving endpoint 102, the one or more applications 501 specify a category of time objective: the categories include a non-time critical objective, a time critical objective, or a near-time critical objective. A non-time critical data stream is a data stream where the data should be received without error; however, time may not be a critical factor (i.e., there may be scenarios (or situations) where time is a critical factor). In these scenarios, a contributing factor for a non-time critical data stream should also include data integrity and thus, in these situations, there is a significant difference between non-time critical, near-time critical and time critical. For example, a non-time critical objective would be specified for a simple file transfer, because the data in this scenario ordinarily should be received without error, and arrival time may not be important for this data.

A near-time critical data stream is a data stream where the data is bound to an endpoint within a range of time. For example, a video stream can possibly be buffered for 5 seconds before the first video frame is displayed on the screen. Or, in the case of a larger memory buffer or hard drive, the first couple of minutes can be burst from the sender to the receiver (i.e., video server to video player). Thus, after the head start (buffer or system priming) has been buffered, the remaining data can be sent in a more leisurely manner, as long as it is received in time to be consumed by the player without interruption in playback. Further, in video streams, it is often the case that some of the packets may be dropped, corrupted or lost due to collision or other network impairments. In this regard, UDP is often the de-facto standard of video streaming and UDP does not guarantee delivery.

For a time-critical data stream, it is usually imperative that the information be received as quickly as possible. Moreover, a time critical objective would be specified when streaming an interactive video stream such as a video conference, because the data in this scenario should be received as soon as possible, while a loss of an insignificant portion of the data may be acceptable.

Because a time objective is specified for the data to be sent, the architecture has greater flexibility in choosing which of the multiple physical interfaces to utilize in sending data. Thus, instead of solely relying on network bandwidth of the multiple physical interfaces, the architecture can utilize the time objectives to provide an even more efficient means of sending data between the endpoints.

For the near-time critical and the time critical data streams, transferring of the stream will involve a payload stream mechanism, a feedback mechanism, and a control stream mechanism. The payload stream mechanism sends the payload content from the sending endpoint 101 to the receiving endpoint 102. In the architecture, the payload stream is sent via a bondable virtual interface, for example, using an RTP-like protocol where multiple physical interfaces will be used to send data to the receiving endpoint 102. The feedback mechanism will be described in detail below in connection with FIGS. 7 to 10. The control stream mechanism sends content control commands from the receiving endpoint 102 to the sending endpoint 101 (e.g., play, pause, etc.) using, for example, an RTSP like protocol.

For a non-time critical data stream, the transferring of the stream within the architecture will have the same behavior as the near-time and the time critical data streams with no control stream. Thus, the transferring of the stream for a non-time critical data stream involves a payload stream mechanism and a feedback mechanism, each having similar characteristics as the stream mechanisms of the near-time and the time critical data streams.

Furthermore, the software libraries 232 and 332 each further comprise a software application program interface 280, as described in connection with FIG. 4, which consists of a set of commands used by the one or more applications 501 and 502 to utilize the architecture. In addition, the software libraries 232 and 332 each instantiate a bondable virtual interface factory 246, as described in connection with FIG. 4, for registering the newly created ones of the plurality of bondable virtual interfaces, unregistering ones of the plurality of bondable virtual interfaces which are no longer available, and providing a list of available bondable virtual interfaces to the data organizer.

As discussed above, the traffic monitors 234 and 334 may communicate with the software libraries 232 and 332, respectively, via a traffic proxy. In this case, the software libraries 234 and 334 each further instantiate a traffic proxy 248 (as described in connection with FIGS. 2 and 4) and a traffic proxy 348 (as described in connection with FIG. 3) for communicating information between the traffic monitors 234 and 334 and the software libraries 232 and 332, respectively, via a shared common interface. The common interface is a shared library, which contains objects containing information and the means to share this common data between the traffic monitors 232 and 332 and the traffic proxies 248 and 348. The transport mechanism can be changed easily and additional information can be added (e.g., by adding new objects).

In general, all interaction between the architecture and other applications is conducted through a basic interface. This basic interface is comprised of a core functionality, which is specific to the architecture, and behavioral functionality, which is specific to the operation of the interfacing application. Examples of core functionality would be a startup and shutdown of the architecture. Behavioral functionality examples might include RTSP, or URL connection functionality. For example, the architecture will provide a setup functionality to extend the standard RTSP setup functionality, in which the extension to RTSP is obtainable from an RTSP OPTIONS command. In another example, URL connection functionality can be added to achieve file transfer behavior.

In the above description with respect to FIGS. 2 to 5, use of the software library can lead to certain efficiencies and programming conveniences, but its use is not mandatory and other libraries can be used, or no library at all, so long as the features of the claims are achieved. A more detailed discussion of an example of the software library can be found in U.S. application Ser. No. 12/463,366, filed May 8, 2009, titled "Efficient Network Utilization Using Multiple Physical Interfaces", by Martin Martinez, et al., the content of which is incorporated by reference herein.

Figure 6:
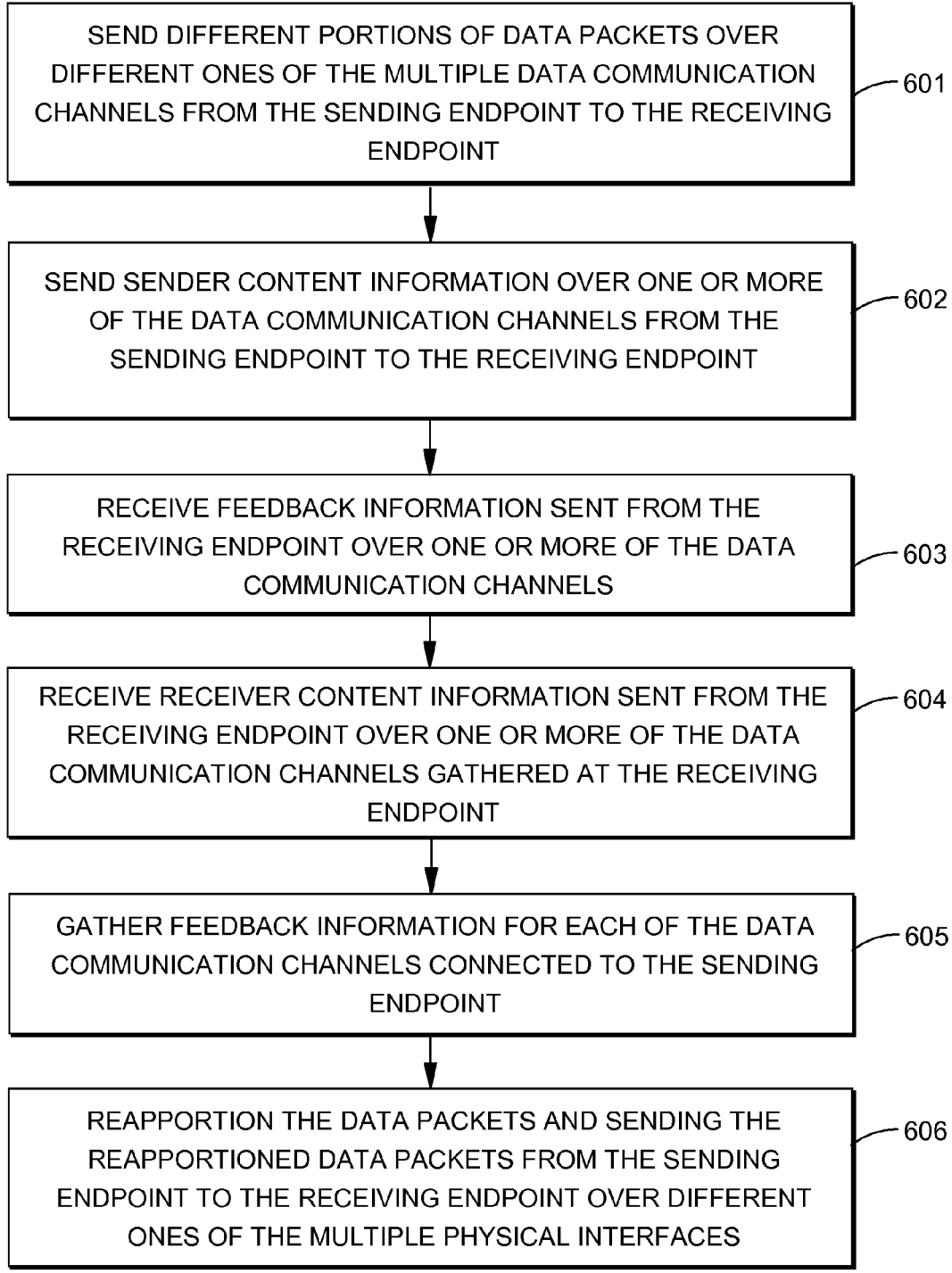
FIG. 6 is a flow chart for providing a detailed explanation of an example embodiment.

Network Streaming Over Multiple Data Communication Channels Using Content Feedback Information FIG. 6 is a flowchart for providing a detailed explanation of an example embodiment. More specifically, FIG. 6 depicts a flowchart for providing a detailed explanation of an example embodiment for sending a single data stream from a sending endpoint 101 to a receiving endpoint 102 as shown in FIG. 1. Both of the sending endpoint 101 and the receiving endpoint 102 each have multiple data communication channels (e.g., data communication channels included in physical interfaces 105a and 105b to 108a and 108b of FIG. 1) connecting the sending endpoint 101 and the receiving endpoint 102 to one or more networks 111 to 114 of FIG. 1, respectively. The process depicted in FIG. 6 and described herein is performed from the perspective of the sender side.

As shown in FIG. 6, in step 601, different portions of data packets are sent over different ones of the multiple data communication channels from the sending endpoint 101 to the receiving endpoint 102. The sending of the different portions of data packets over different ones of the multiple data communication channels is based at least partially on a data capacity throughput for each of the multiple data communication channels. Here, data capacity throughput is the maximum bandwidth minus a current usage of bandwidth. The data may be sent using many different methods. Examples of such methods can be found in U.S. application Ser. No. 12/463,367, titled "Network Streaming of a Single Data Stream Simultaneously Over Multiple Physical Interfaces", by Eric Riggert, et al., filed May 8, 2009, U.S. application Ser. No. 12/463,372, titled "Reliable Network Streaming of a Single Data Stream Over Multiple Physical Interfaces", by Martin Martinez, et al., filed May 8, 2009, and U.S. application Ser. No. 12/471,319, titled "Efficient Bandwidth Utilization When Streaming Data Over Multiple Physical Interfaces", by Martin Martinez, et al., filed May 22, 2009, the content of each of which is included by reference herein.

In step 602, sender content information is sent over one or more of the data communication channels from the sending endpoint 101 to the receiving endpoint 102. The sender content information, includes, but is not limited to, header information including timestamps or Frame IDs for data which is sent from the sending endpoint 101. Frame IDs can be implemented by leveraging an existing protocol field (e.g., a timestamp), by wrapping of an existing frame with an internal content that the receiving endpoint 102 would be able to parse, or by creating an internal field developed with a bondable virtual interface. In addition, the sender content information may include, but is not limited to, content feedback comprising enhanced network statistics and/or calculations regarding the individual and aggregated data communication channels. When sending the sender content information regarding the streaming data in step 602, the sender content information may be split and sent from the sending endpoint 101 to the receiving endpoint 101 over different ones of the multiple data communication channels.

In step 602, the sender content information sent to the receiving endpoint 102 may be a first set of sender content information, and the first set of sender content information may be sent over one of the multiple data communication channels. In this case, a second set of sender content information may be subsequently sent over a different one of the multiple data communication channels. For example, a first set of sender content information may be sent over a data communication channel included in physical interface 105a. Subsequently, a second set of sender content information may be sent over a data communication channel included in physical interface 106a. Alternatively, the first set of sender content information may be sent over a first data communication channel simultaneously as the second set of sender content information is sent over a second data communication channel. In addition, any number of sets of sender content information may be sent at substantially the same time over different ones of the data communication channels. Moreover, subsequent sets of sender content information may be sent over the same data communication channels, or may be sent over different data communication channels.

In step 602, when the sender content information is split and sent to the receiving endpoint 102 over different ones of the multiple data communication channels, the sender content information may be a first set of sender content information. In this case, a second set of sender content information regarding the streaming data may be split and sent to the receiving endpoint 102 over multiple data communication channels, which are different than the ones of the multiple data communication channels on which the first set of sender content information was sent. For example, a first set of sender content information may be segmented into many portions, and the different portions of the first sender content information may be sent over different data communication channels included in physical interfaces 105*a* and 106*a*. Subsequently, a second set of sender content information may be segmented into many portions, and the different portions of the second set of sender content information may be sent over different data communication channels included in physical interfaces 107*a* and 108*a*. Alternatively, the different portions of the first set of sender content information may be sent over different data communication channels included in physical interfaces 105*a* and 106*a* at substantially the same time as the different portions of the second set of sender content information are sent over different communication channels included in physical interfaces 107*a* and 108*a*.

In some cases, the sender content information sent by the sending endpoint 101 in step 602 may be sent as a sender report such as a RTCP sender report. Generally, the sender report is sent periodically by an active sender in a conference to report transmission and reception statistics for all RTP packets sent during an interval. The sender report includes an absolute timestamp, which is the number of second elapsed since midnight on Jan. 1, 1900. The absolute timestamp allows the receiver to synchronize RTP messages. This is particularly important when both audio and video are transmitted simultaneously, because audio and video streams use independent relative timestamps.

In step 603, feedback information sent from the receiving endpoint 102 over one or more of the data communication channels is received by the sending endpoint 101. The feedback information is gathered for each of the data communication channels connected to the receiving endpoint 102. In this regard, the feedback information is information regarding streamed data which is gathered, for example, by timing data packets sent between the endpoints. The feedback information includes, for example, network statistics that include increases and reductions in a data capacity throughput for each of the data communication channels connected to the receiving endpoint 102. The feedback information is not limited to the aforementioned examples, and may include other different types of information as well. Examples of different types of information are described in detail in U.S. application Ser. No. 12/732,167, titled "Providing Feedback Information When Network Streaming Over Multiple Physical Interfaces", by Martin Martinez, et al., filed Mar. 25, 2010, and U.S. application Ser. No. 12/732,169, titled "Network Streaming Over Multiple Physical Interfaces Using Feedback Information", by Martin Martinez, et al., filed Mar. 25, 2010, the content of each of which is incorporated by reference herein.

In step 604, receiver content information gathered at and sent from the receiving endpoint 102 over one or more of the data communication channels is received by the sending endpoint 101. Receiver content information includes, but is not limited to, header information including timestamps or Frame IDs for data received at the receiving endpoint 102. In addition, the receiver content information may include, but is not limited to, content feedback comprising enhanced network statistics and/or calculations regarding the individual and aggregated data communication channels. The enhanced network statistics may be generated using a number of different methods, the methods being at least partially based on an awareness of a protocol being used. Three examples of such methods are as follows: (1) protocol aware content feedback, (2) media format aware content feedback, and (3) application layer aware content feedback.

Protocol Aware Content Feedback

For protocol aware content feedback, when sending data over the multiple data communication channels from the sending endpoint 101 to the receiving endpoint 102, the receiving endpoint 102 inspects/parses the data stream to find protocol headers. For example, a data combiner 338 included in the receiving endpoint 102 may inspect RTP protocol headers for timestamp or Frame ID information for data received at the receiving endpoint 102, which is used by the receiving endpoint 102 to create statistics, in correlation with the information included in the sender content information, about data received from the network, such as transmission delay, data apportionment by the sending endpoint 101 over each of the data communication channels, and data loss per data communication channel. Such data pertaining to each of the data communication channels of the receiving endpoint 102 may not be easily gathered through physical feedback information (i.e., receive-timing of network data). Thus, the data stream content header information provides enhanced network statistics regarding the individual and aggregated data communication channels. This information can then be included in the receiver content information.

In addition, the RTP protocol headers may be inspected for data output from the data combiner 338 for the purpose of creating statistics about the data output from the data combiner 338 included in the receiving endpoint 102. The receiving endpoint 102 can then use these statistics to make calculations such as improved or non-standard/proprietary jitter calculations, or jitter calculations related to each data communication channel at the receiving endpoint 102, and/or compared to the jitter calculations for an overall combined output. This information can also be included in the receiver content information.

Media Format Aware Content Feedback

For media format aware content feedback, the data may be streamed without the aid of protocols as described above in the method of protocol aware content feedback. However, in a case that the data is streamed with the aid of protocols, this method may be used in addition to the method protocol aware content feedback. In the media format aware content feedback method, the data combiner may inspect the media format (e.g., MPEG 2, MPEG 4, etc.) headers of the streaming data to extract information such as stream bit rate, frame rate, frame boundaries, and sequence/frame numbering information. This information can also be included in the receiver content information.

Application Layer Aware Content Feedback

While the methods of protocol aware content feedback and media format aware content feedback provide content feedback information which is received and acted upon invisibly to the application layer, in this method, the receiver content information may also include application layer changes which allow enhanced content feedback information. More specifically, known protocols often include a mechanism for extending existing header information of reports. For example, RTCP receiver reports may be extended to include information such as the statistics and customized calculations described above. In this case, a bondable virtual interface may intercept and modify all such reports on both the sending endpoint 101 and the receiving endpoint 102 to include the extended information, allowing the continued use of unmodified application software on the sending endpoint 101 and the receiving endpoint 102. Alternatively, the application software on the sending endpoint 101 and the receiving endpoint 102 may themselves be modified to include the additional information when sending their respective reports.

In other situations, a bondable virtual interface could spoof protocol reports, generating additional reports which would appear to originate with a receiving endpoint 102 application. The spoof protocol reports would include the extended information. These additional spoof protocol reports may be used for protocols, such as RTP, in which receiver reports are generated periodically. If it is desired to send the extended information immediately, for example, at a time when there is no receiver report which can be extended, the receiving endpoint bondable virtual interface can send a spoofed additional/immediate report.

Alternatively, actual RTCP receiver reports can be replaced with bondable virtual interface generated reports. In one instance, a receiver generated protocol report may be replaced with a bondable virtual interface when the standard receiver report includes measurements (e.g., measurements regarding Jitter), which can be addressed by modifying the behavior of the sending bondable virtual interface (i.e., the splitter), rather than modifying the behavior of the sending application. For example, if network congestion or failure is detected on one of the plurality of data communication channels which make up the bondable virtual interface, the receiving bondable virtual interface will generate feedback used to reapportion sending of data away from the failed interfaces. This can improve the receiving application's measured Jitter performance without a modification of the sending application data rate. Therefore, if, in such a case, the protocol report from the receiver indicates jitter, the bondable virtual interface can spoof the application protocol report, replacing it with a message which indicates less (or no) jitter, while also including information which is used to address the underlying network issue using the sending bondable virtual interface.

The foregoing three example methods of protocol aware content feedback, media format aware content feedback, and application layer aware content feedback have been described in connection with receiver content information. However, the three example methods are also applicable to sender content information.

In step 605 of FIG. 6, feedback information is gathered by the sending endpoint 101 for each of the data communication channels connected to the sending endpoint 101. Similar to the feedback information gathered for each of the data communication channels connected to the receiving endpoint, the feedback information gathered by the sending endpoint 101 includes, for example, network statistics that include increases and reductions in a data capacity throughput for each of the data communication channels connected to the sending endpoint 101. The feedback information is not limited to the aforementioned examples, and may include other different types of information as well. Examples of different types of information are described in detail in above-mentioned U.S. application Ser. Nos. 12/732,167 and 12/732,169.

In step 606, the data packets are reapportioned and sent from the sending endpoint 101 to the receiving endpoint 102 over different ones of the data communication channels. The reapportionment is based at least partially on the feedback information gathered at the receiving endpoint 102, the sender content information, the receiver content information, and/or the feedback information gathered at the sending endpoint 101. More specifically, the sending endpoint 101 adjusts the splitting and sending of data over the multiple data communication channels based on a correlation of network statistics included in the feedback information gathered at the receiving endpoint 102, the sender content information, the receiver content information, and/or the feedback information gathered at the sending endpoint 101. Examples of different methods of adjusting the splitting and sending of data can be found in above-mentioned U.S. application Ser. Nos. 12/463,367, 12/463,372, and 12/471,319.

By virtue of the foregoing example embodiment, it is ordinarily possible when sending data between endpoints of a network over multiple data communication channels, to minimize possible negative effects on a quality and efficiency of data delivery due to changing network conditions. More specifically, since content information gathered at the receiving endpoint 102, together with feedback information, is provided to the sending endpoint 101, an intelligent selection can be made as to which data communication channels are used to send and receive the data. Since the gathered feedback information includes feedback information with respect to each of the data communication channels, together with content information regarding the data stream, possible negative effects on a quality and efficiency of sent data may be substantially reduced. In particular, possible negative effects on a quality and efficiency of sent data may be substantially reduced because the data is sent using knowledge of the conditions on both the sending endpoint 101 and the receiving endpoint 102, together with knowledge of the content of the data stream.

In such cases that the sender content information is sent as a sender report in step 602 of FIG. 6, the sender report may be extended to include additional information, as described above in connection with the three example methods of content feedback, to be processed by the receiving endpoint 102.

The additional information described above may be added to the sender report by a sending application at the sending endpoint 101. Alternatively, the sender report may be intercepted by a bondable virtual interface included at the sending endpoint 101, and the bondable virtual interface included at the sending endpoint 101 may add the additional information to the sender report. In this situation, an application included in the sending endpoint 101 may be unaware of the additional information included in the sender report, as described above.

In other situations, a bondable virtual interface included at the sending endpoint 101 may create a spoof sender report to replace or be sent in addition to the sender report. In these situations, the spoof sender report includes additional information, as described above, to be processed by the receiving endpoint 102.

Figure 7:
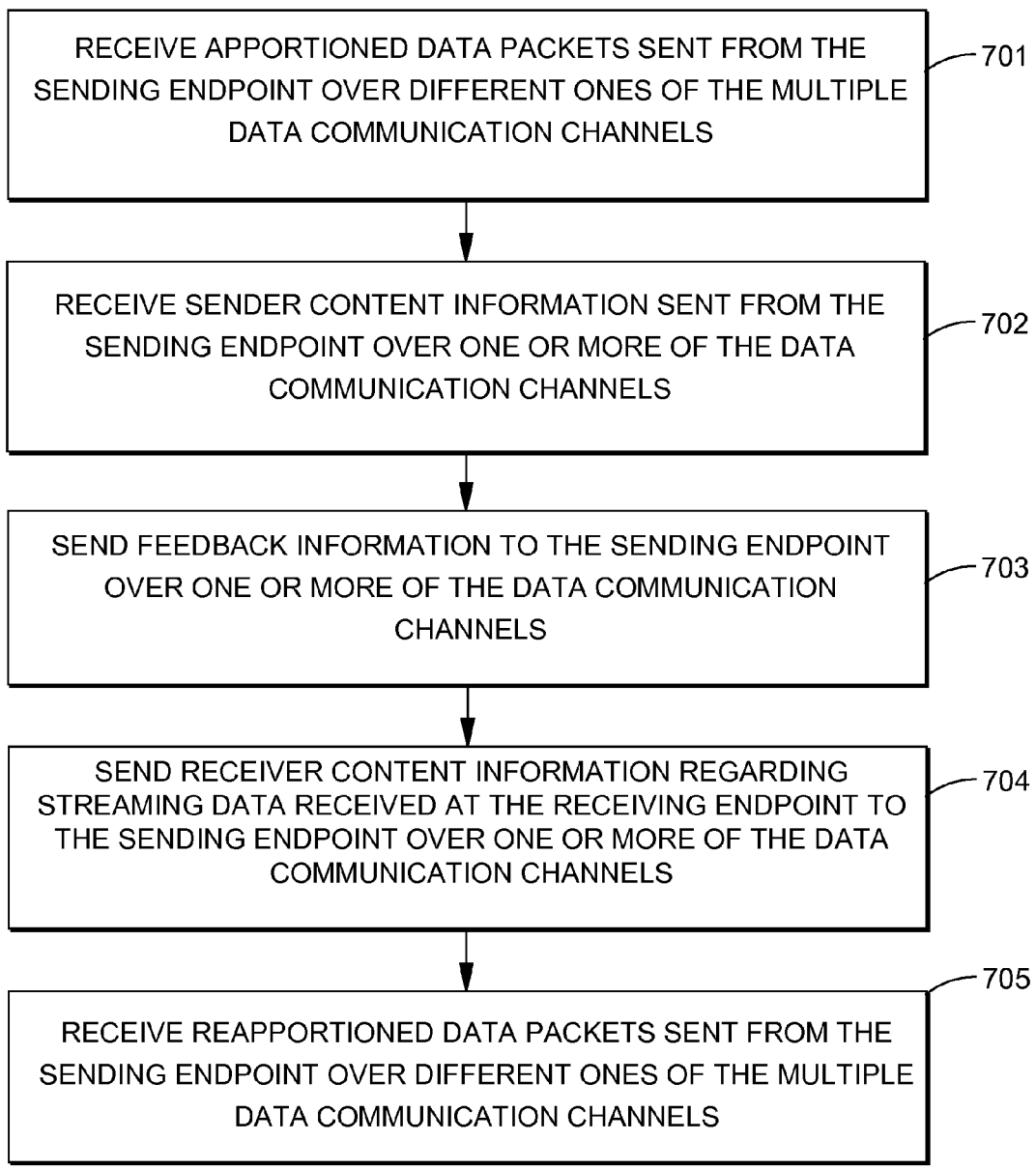
FIG. 7 is a flow chart for providing a detailed explanation of another example embodiment.

FIG. 7 is a flowchart for providing a detailed explanation of an example embodiment. More specifically, FIG. 7 depicts a flowchart for providing a detailed explanation of an example embodiment for sending a single data stream from a sending endpoint 101 to a receiving endpoint 102 as shown in FIG. 1. Both of the sending endpoint 101 and the receiving endpoint 102 each have multiple data communication channels (e.g., data communication channels included in physical interfaces 105a and 105b to 108a and 108b of FIG. 1) connecting the sending endpoint 101 and the receiving endpoint 102 to one or more networks 111 to 114 of FIG. 1, respectively. The process depicted in FIG. 7 and described herein is performed from the perspective of the receiver side. Moreover, many aspects of the process performed from the perspective of the receiver side are similar to aspects of the process described in FIG. 6, and are omitted in the description of FIG. 7 for the sake of brevity.

As shown in FIG. 7, in step 701, apportioned data packets sent from the sending endpoint 101 over different ones of the multiple data communication channels are received by the receiving endpoint 102. In step 702, sender content information sent from the sending endpoint 101 over one or more of the data communication channels is received by the receiving endpoint 102. In step 703, feedback information is sent by the receiving endpoint 102 to the sending endpoint 101 over one or more of the data communication channels. The feedback information is gathered for each of the data communication channels connected to the receiving endpoint 102.

In step 702, the receiver content information sent to the sending endpoint 101 may be a first set of receiver content information, and the first set of receiver content information may be sent over one of the multiple data communication channels. In this case, a second set of receiver content information may be subsequently sent to the sending endpoint 101 over a different one of the multiple data communication channels. For example, a first set of receiver content information may be sent over a data communication channel included in physical interface 105b. Subsequently, a second set of receiver content information may be sent over a data communication channel included in physical interface 106b. Alternatively, the first set of receiver content information may be sent over a first data communication channel simultaneously as the second set of receiver content information is sent over a second data communication channel. In addition, any number of sets of receiver content information may be sent at substantially the same time over different ones of the data communication channels. Moreover, subsequent sets of receiver content information may be sent over the same data communication channels, or may be sent over different data communication channels.

In step 702, when the receiver content information is split and sent over different ones of the multiple data communication channels, the receiver content information may be a first set of receiver content information. In this case, a second set of receiver content information may be subsequently split and sent to the sending endpoint 101 over multiple data communication channels, which are different than the ones of the multiple data communication channels on which the first set of receiver content information was sent. For example, a first set of receiver content information may be segmented into many portions, and the different portions of the first receiver content information may be sent over different data communication channels included in physical interfaces 105b and 106b. Subsequently, a second set of receiver content information may be segmented into many portions, and the different portions of the second set of receiver content information may be sent over different data communication channels included in physical interfaces 107b and 108b. Alternatively, the different portions of the first set of receiver content information may be sent over different data communication channels included in physical interfaces 105b and 106b at substantially the same time as the different portions of the second set of receiver content information are sent over different communication channels included in physical interfaces 107b and 108b.

In step 704, the receiving endpoint 102 sends receiver content information regarding streaming data received at the receiving endpoint 102 to the sending endpoint 101 over one or more of the data communication channels. When sending the receiver content information, the receiver content information may be sent via a single data communication channel. Alternatively, when sending the receiver content information, the receiver content information may be split and sent over different ones of the multiple data communication channels.

In step 705, reapportioned data packets sent from the sending endpoint 101 over different ones of the multiple data communication channels are received by the receiving endpoint 102. The data packets are reapportioned based at least partially on the feedback information gathered at the receiving endpoint 102, the sender content information, the receiver content information and/or feedback information gathered at the sending endpoint 101 for each of the data communication channels connected to the sending endpoint 101. The reapportionment by the sending endpoint 101 is described above in detail in connection with FIG. 6.

In some cases, the receiving endpoint 102 includes a data combiner 338 that combines data packets received at the receiving endpoint 102. The data combiner 338 inspects the data received at the receiving endpoint 102 for protocol headers to gather the receiver content information. In addition, the data combiner may inspect the data output from the data combiner 338 for protocol headers to gather the receiver content information.

In other situations, the data combiner 338 can inspect the data received at the receiving endpoint 102 for media format headers (e.g., MPEG 2, MPEG 4, etc.) to gather the receiver content information. Moreover, the data combiner may inspect the data received at the receiving endpoint 102 for protocol headers, as well as media format headers included in the received data.

In some situations, the receiver content information sent by the receiving endpoint 102 may be a receiver report. The receiver report is for passive participants, i.e., those that do not send RTP packets. The receiver report informs the sender and other receivers about the quality of service for streaming data.

In these situations, the receiver report may be extended to include additional information, as described above in connection with the three content feedback methods, to be processed by the sending endpoint 101. The additional information described in detail above may be added to the receiver report by a receiving application included at the receiving endpoint 102.

Alternatively, the receiver report may be intercepted by a bondable virtual interface included at the receiving endpoint 102, and the bondable virtual interface at the receiving endpoint 102 may add the additional information to the receiver report. In this case, an application included in the receiving endpoint 102 may be unaware of the additional information included in the receiver report.

In other situations, a bondable virtual interface included at the receiving endpoint 102 may create a spoof receiver report to replace or be sent in addition to the receiver report. In these situations, the spoof receiver report may include additional information to be processed by the sending endpoint 101.

Figure 8:
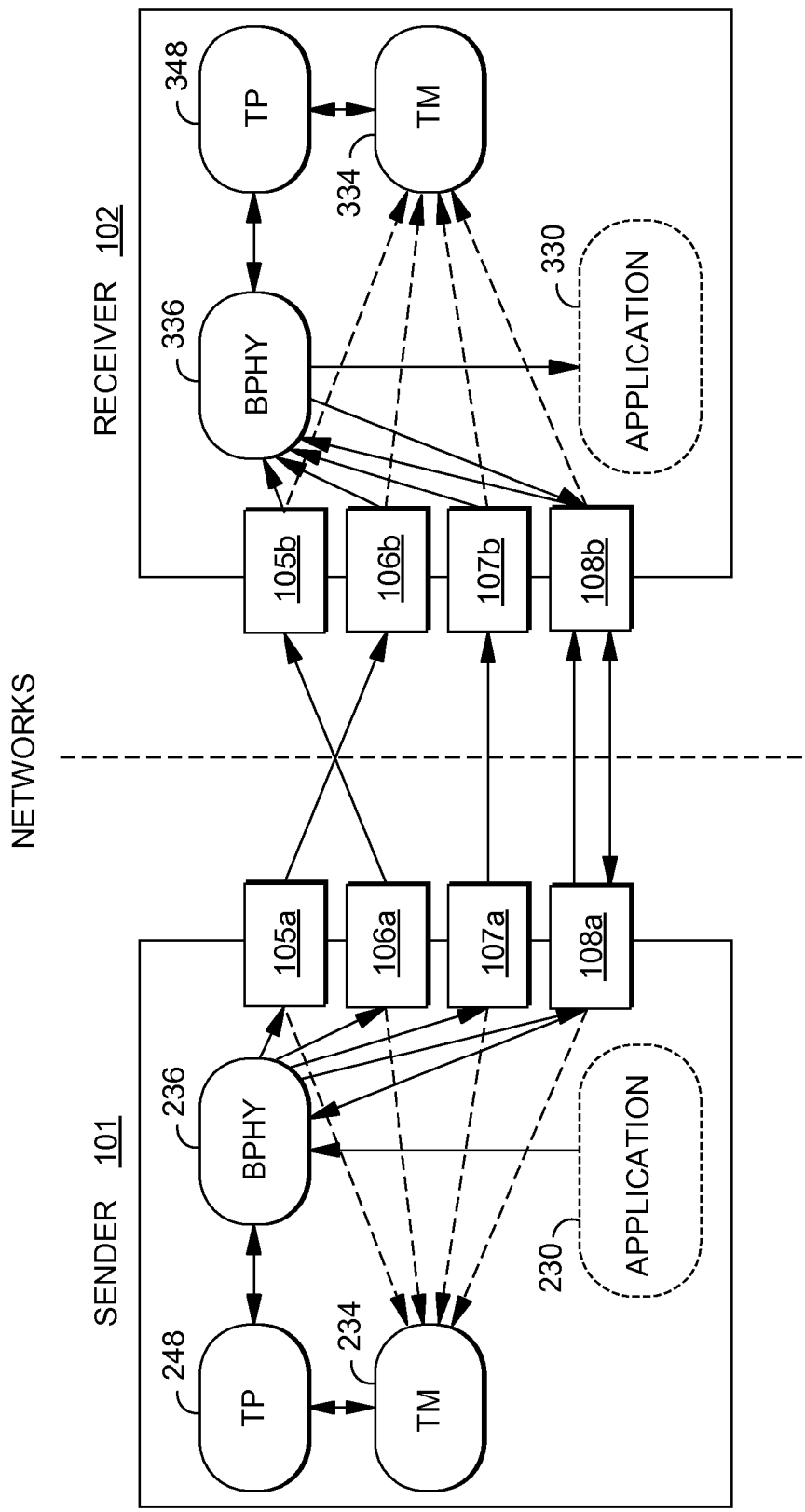
FIG. 8 is another view of a sending endpoint and a receiving endpoint, for providing a general explanation of an example embodiment.
Figure 9:
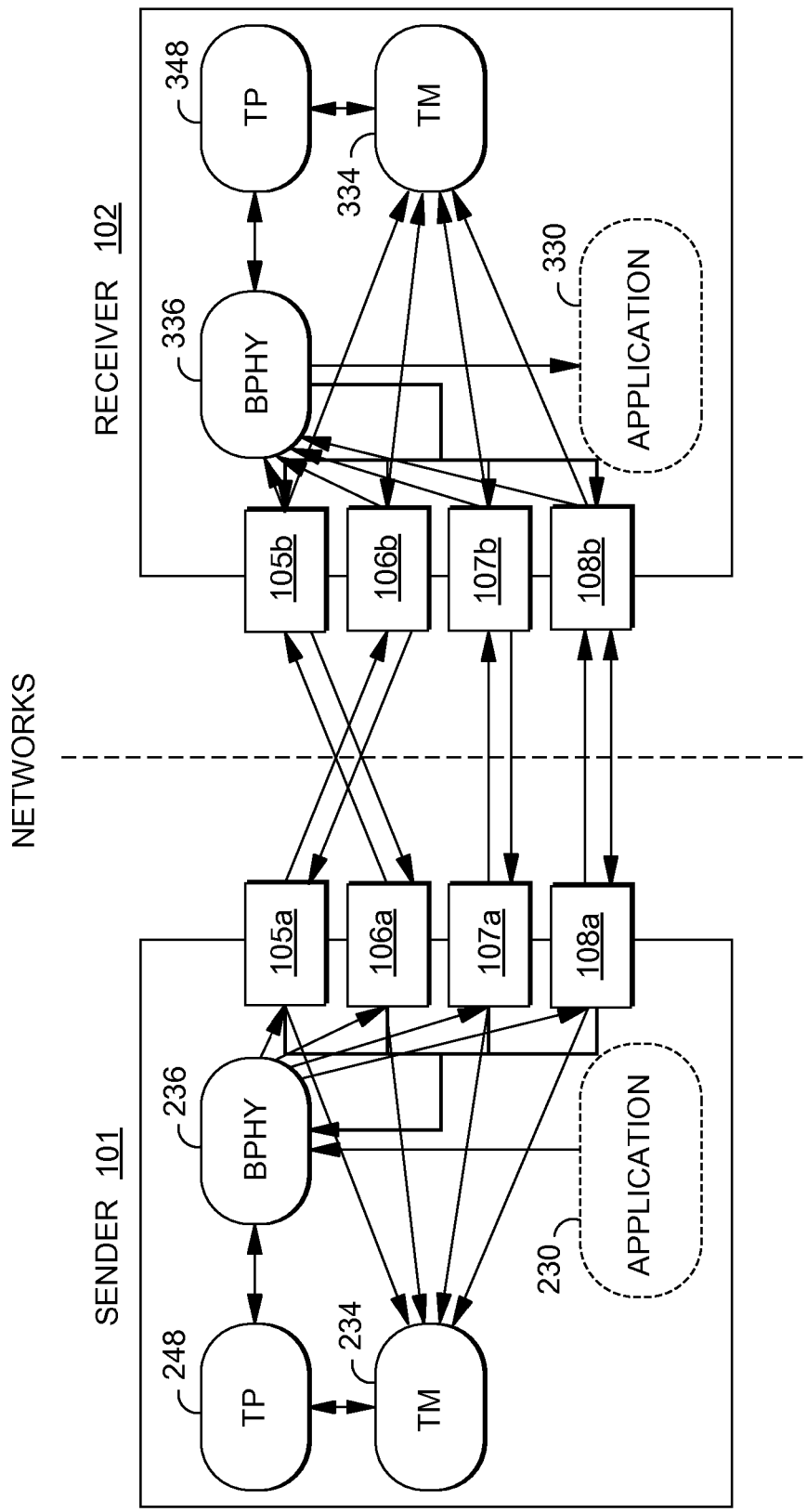
FIG. 9 is yet another view of a sending endpoint and a receiving endpoint, for providing a general explanation of another example embodiment.

FIGS. 8 and 9 are other views of a sending endpoint 101 and a receiving endpoint 102, for providing illustrations of certain aspects described above in connection with FIGS. 6 and 7. As shown in FIG. 8, application program 230 provides data to the bondable virtual interface 236. In turn, the bondable virtual interface 236 splits the data and sends the split data over multiple data communication channels, to the receiving endpoint 102. As further shown in FIG. 8, the traffic monitor 234 gathers physical interface information as feedback information from each of the physical interfaces 105a to 108a. In addition, the bondable virtual interface 236 gathers information regarding data sent over the multiple data communication channels, and sends the data information to the traffic proxy 248. The traffic proxy 248 then sends the data information to the traffic monitor 234. The traffic monitor 234 then analyzes the data information provided by the bondable virtual interface 236 and the gathered information from the multiple physical interfaces 105a to 108a, and sends the analyzed information to the bondable virtual interface 234 through the traffic proxy 248. In other embodiments, the traffic monitor 234 and the bondable virtual interface 236 send information back and forth without using the traffic proxy 248.

On the receiving endpoint 102, the bondable virtual interface 336 combines data received over the data communication channels within the multiple physical interfaces 105b to 108b. In turn, the bondable virtual interface 336 sends the combined data to the application program 330. As shown in FIG. 8, the traffic monitor 334 gathers physical interface information as feedback information from each of the physical interfaces 105b to 108b. In addition, the bondable virtual interface 336 gathers information regarding data received on multiple physical interfaces 105b to 108b, and sends the data information to the traffic proxy 348. The traffic proxy 348 then sends the data information to the traffic monitor 334. The traffic monitor 334 then analyzes the data information provided by the bondable virtual interface 336 and the gathered information from the multiple physical interfaces 105b to 108b, and sends the analyzed information to the bondable virtual interface 334 through the traffic proxy 348. In other embodiments, the traffic monitor 334 and the bondable virtual interface 336 send information back and forth without using the traffic proxy 348.

In FIG. 8, the bondable virtual interface 336 sends the analyzed information received from the traffic monitor 334 as feedback information over a data communication channel included in physical interface 108b to a data communication channel included in physical interface 108a connected to the sending endpoint 101. However, as discussed above in connection with FIGS. 6 and 7, the feedback information may be sent over a data communication channel included in any one of the other physical interfaces. For example, the feedback information may be sent over a data communication channel included in the physical interface 105b to a data communication channel included in the physical interface 106a, may be sent over a data communication channel included in the physical interface 106b to a data communication channel included in the physical interface 105a, or may be sent over a data communication channel included in the physical interface 107b to a data communication channel included in the physical interface 107a.

In addition, the sender content information and the receiver content information can be sent in a substantially similar manner as described above in connection with sending the feedback information. In one situation, the sender content information and the receiver content information can be sent in synchronization with the sending of the feedback information. In another situation, the sender content information and the receiver content information can be sent without synchronizing with the sending of the feedback information. Moreover, the bondable virtual interfaces 336 and 236 are responsible for decoding the sender content information and the receiver content information, respectively. More specifically, the bondable virtual interfaces 236 and 336 may decode the sender content information and the receiver content information, based on the type of content information (e.g., RTCP). Alternatively, the bondable virtual interfaces 236 and 336 may parse the sender content information and the receiver content information.

FIG. 9 shows a similar architecture as FIG. 8, and the description of such is being omitted here for the sake of brevity. In FIG. 9, the bondable virtual physical interface 336 splits the feedback information, and apportions the split feedback information over multiple data communication channels included in the multiple physical interfaces 105b to 108b. The apportioned feedback information is then sent from the multiple data communication channels included in the physical interfaces 105b to 108b to their respective multiple data communication channels included in the physical interfaces at the sending endpoint 101, namely 106a, 105a, 107a and 108a. As mentioned above in connection with FIGS. 6 and 7, the number of data communication channels included in the physical interfaces used to send the feedback information can vary from 1 to 4, or more.

In addition, the sender content information and the receiver content information can be sent in a substantially similar manner as described above in connection with sending the feedback information. In one situation, the sender content information and the receiver content information can be sent in synchronization with the sending of the feedback information. In another situation, the sender content information and the receiver content information can be sent without synchronizing with the sending of the feedback information. Moreover, the bondable virtual interfaces 336 and 236 are responsible for decoding the sender content information and the receiver content information, respectively. More specifically, the bondable virtual interfaces 236 and 336 may decode the sender content information and the receiver content information, based on the type of content information (e.g., RTCP). Alternatively, the bondable virtual interfaces 236 and 336 may parse the sender content information and the receiver content information.

This disclosure has provided a detailed description with respect to particular illustrative embodiments. It is understood that the scope of the appended claims is not limited to the above-described embodiments and that various changes and modifications may be made by those skilled in the relevant art without departing from the scope of the claims.

What is claimed is:

1. A method for sending a single data stream from a sending endpoint to a receiving endpoint, wherein both of the sending endpoint and the receiving endpoint each have multiple data communication channels connecting the sending endpoint and the receiving endpoint, comprising:

splitting the single data stream into different portions of data packets and sending the different portions of data packets substantially simultaneously over different ones of the multiple data communication channels from the sending endpoint to the receiving endpoint;

sending sender content information over one or more of the data communication channels from the sending endpoint to the receiving endpoint;

receiving feedback information sent from the receiving endpoint over one or more of the data communication channels, wherein the feedback information is gathered for each of the data communication channels connected to the receiving endpoint;

receiving receiver content information sent from the receiving endpoint over one or more of the data communication channels gathered at the receiving endpoint;

gathering feedback information for each of the data communication channels connected to the sending endpoint; and reapportioning the data packets and sending the reapportioned data packets from the sending endpoint to the receiving endpoint substantially simultaneously over different ones of the multiple data communication channels, wherein the reapportionment is based on the feedback information gathered at the receiving endpoint, the sender content information, the receiver content information, and the feedback information gathered at the sending endpoint, wherein the sender content information and the receiver content information each comprises:

header information including timestamps or frame IDs, and content feedback comprising enhanced network statistics and calculations regarding each data communication channel and an aggregation of the multiple data communication channels.

2. The method according to claim 1, wherein the sending of the different portions of data packets over different ones of the multiple data communication channels is based at least partially on a data capacity throughput for each of the multiple data communication channels.

3. The method according to claim 1, wherein the sender content information sent to the receiving endpoint is a first set of sender content information, and the first set of sender content information is sent over one of the multiple data communication channels, and wherein the method further comprises:

sending a second set of sender content information over a different one of the multiple data communication channels.

4. The method according to claim 1, wherein when sending the sender content information regarding the streaming data, the sender content information is split and sent to the receiving endpoint over different ones of the multiple data communication channels.

5. The method according to claim 4, wherein the sender content information sent to the receiving endpoint is a first set of sender content information, and wherein the method further comprises:

splitting and sending a second set of sender content information regarding the streaming data to the receiving endpoint over multiple data communication channels, which are different than the ones of the multiple data communication channels on which the first set of sender content information was sent.

6. The method according to claim 1, wherein the sender content information sent by the sending endpoint is sent as a sender report.

7. The method according to claim 6, wherein the sender report is extended to include additional information to be processed by the receiving endpoint.

8. The method according to claim 7, wherein a sending application at the sending endpoint adds the additional information to the sender report.

9. The method according to claim 7, wherein the sender report is intercepted by a bondable virtual interface included at the sending endpoint, and the bondable virtual interface included at the sending endpoint adds the additional information to the sender report, and wherein an application included in the sending endpoint is unaware of the additional information included in the sender report.

10. The method according to claim 6, wherein a bondable virtual interface included at the sending endpoint creates a spoof sender report to replace, or be sent in addition to the sender report, and the spoof sender report includes additional information to be processed by the receiving endpoint.

11. The method according to claim 1, wherein the enhanced network statistics are generated using one or more of the following methods:

(1) protocol aware content feedback,
(2) media format aware content feedback, and
(3) application layer aware content feedback.

12. A method for sending a single data stream from a sending endpoint to a receiving endpoint, wherein both of the sending endpoint and the receiving endpoint each have multiple data communication channels connecting the sending endpoint and the receiving, comprising:

receiving apportioned data packets sent from the sending endpoint over different ones of the multiple data communication channels, wherein the single data stream is split into different portions of data packets and the different portions of data packets are sent substantially simultaneously over different ones of the multiple data communication channels from the sending endpoint to the receiving endpoint;

receiving sender content information sent from the sending endpoint over one or more of the data communication channels;

sending feedback information to the sending endpoint over one or more of the data communication channels, wherein the feedback information is gathered for each of the data communication channels connected to the receiving endpoint;

sending receiver content information regarding streaming data received at the receiving endpoint to the sending endpoint over one or more of the data communication channels; and receiving reapportioned data packets sent from the sending endpoint substantially simultaneously over different ones of the multiple data communication channels, wherein the data packets are reapportioned based on the feedback information gathered at the receiving endpoint, the sender content information, the receiver content information and feedback information gathered at the sending endpoint for each of the data communication channels connected to the sending endpoint, wherein the sender content information and the receiver content information each comprises:

header information including timestamps or frame IDs, and content feedback comprising enhanced network statistics and calculations regarding each data communication channel and an aggregation of the multiple data communication channels.

13. The method according to claim 12, wherein the receiver content information sent to the sending endpoint is a first set of receiver content information, and the first set of receiver content information is sent over one of the multiple data communication channels, and wherein the method further comprises:

sending a second set of receiver content information to the sending endpoint over a different one of the multiple data communication channels.

14. The method according to claim 12, wherein when sending the receiver content information, the receiver content information is split and sent over different ones of the multiple data communication channels.

15. The method according to claim 14, wherein the receiver content information sent to the sending endpoint is a first set of receiver content information, and wherein the method further comprises:

splitting and sending a second set of receiver content information to the sending endpoint over multiple data communication channels, which are different than the ones of the multiple data communication channels on which the first set of receiver content information was sent.

16. The method according to claim 12, wherein the receiving endpoint includes a data combiner that combines data packets received at the receiving endpoint.

17. The method according to claim 16, wherein the data combiner inspects the data received at the receiving endpoint for protocol headers to gather the receiver content information.

18. The method according to claim 16, wherein the data combiner inspects the data output from the data combiner for protocol headers to gather the receiver content information.

19. The method according to claim 16, wherein the data combiner inspects the data received at the receiving endpoint for media format headers to gather the receiver content information.

20. The method according to claim 12, wherein the receiver content information sent by the receiving endpoint is a receiver report.

21. The method according to claim 20, wherein the receiver report is extended to include additional information to be processed by the sending endpoint.

22. The method according to claim 21, wherein a receiving application at the receiving endpoint adds the additional information to the receiver report.

23. The method according to claim 21, wherein the receiver report is intercepted by a bondable virtual interface included at the receiving endpoint, and the bondable virtual interface at the receiving endpoint adds the additional information to the receiver report, and wherein an application included in the receiving endpoint is unaware of the additional information included in the receiver report.

24. The method according to claim 20, wherein a bondable virtual interface included at the receiving endpoint creates a spoof receiver report to replace or be sent in addition to the receiver report, wherein the spoof receiver report includes additional information to be processed by the sending endpoint.

25. The method according to claim 12, wherein the enhanced network statistics are generated using one or more of the following methods:
(1) protocol aware content feedback,
(2) media format aware content feedback, and
(3) application layer aware content feedback.

26. A sending endpoint comprising:
a computer-readable memory constructed to store computer-executable process steps; and
a processor constructed to execute the computer-executable process steps stored in the memory,
wherein the process steps in the memory cause the processor to send a single data stream from the sending endpoint to a receiving endpoint, wherein both of the sending endpoint and the receiving endpoint each have multiple data communication channels connecting the sending endpoint and the receiving endpoint, and wherein the process steps stored in the memory include computer-executable steps to:
split the single data stream into different portions of data packets and send the different portions of data packets substantially simultaneously over different ones of the multiple data communication channels from the sending endpoint to the receiving endpoint;
send sender content information over one or more of the data communication channels from the sending endpoint to the receiving endpoint;
receive feedback information sent from the receiving endpoint over one or more of the data communication channels, wherein the feedback information is gathered for each of the data communication channels connected to the receiving endpoint;
receive receiver content information sent from the receiving endpoint over one or more of the data communication channels gathered at the receiving endpoint;
gather feedback information for each of the data communication channels connected to the sending endpoint; and
reapportion the data packets and sending the reapportioned data packets from the sending endpoint to the receiving endpoint substantially simultaneously over different ones of the multiple data communication channels, wherein the reapportionment is based on the feedback information gathered at the receiving endpoint, the sender content information, the receiver content information, and the feedback information gathered at the sending endpoint,
wherein the sender content information and the receiver content information each comprises:
header information including timestamps or frame IDs, and
content feedback comprising enhanced network statistics and calculations regarding each data communication channel and an aggregation of the multiple data communication channels.

27. A receiving endpoint comprising:
a computer-readable memory constructed to store computer-executable process steps; and
a processor constructed to execute the computer-executable process steps stored in the memory,
wherein the process steps in the memory cause the processor to send a single data stream from a sending endpoint to the receiving endpoint, wherein both of the sending endpoint and the receiving endpoint each have multiple data communication channels connecting the sending endpoint and the receiving endpoint, and wherein the process steps stored in the memory include computer-executable steps to:
receive apportioned data packets sent from the sending endpoint over different ones of the multiple data communication channels, wherein the single data stream is split into different portions of data packets and the different portions of data packets are sent substantially simultaneously over different ones of the multiple data communication channels from the sending endpoint to the receiving endpoint;
receive sender content information sent from the sending endpoint over one or more of the data communication channels;
send feedback information to the sending endpoint over one or more of the data communication channels, wherein the feedback information is gathered for each of the data communication channels connected to the receiving endpoint;
send receiver content information regarding streaming data received at the receiving endpoint to the sending endpoint over one or more of the data communication channels; and
receive reapportioned data packets sent from the sending endpoint substantially simultaneously over different ones of the multiple data communication channels, wherein the data packets are reapportioned based on the feedback information gathered at the receiving endpoint, the sender content information, the receiver content information and feedback information gathered at the sending endpoint for each of the data communication channels connected to the sending endpoint,
wherein the sender content information and the receiver content information each comprises:
header information including timestamps or frame IDs, and
content feedback comprising enhanced network statistics and calculations regarding each data communication channel and an aggregation of the multiple data communication channels.

28. A computer-readable memory medium on which is stored computer-executable process steps for causing a processor to send a single data stream from a sending endpoint to a receiving endpoint, wherein both of the sending endpoint and the receiving endpoint each have multiple data communication channels connecting the sending endpoint and the receiving endpoint, the process steps comprising:

splitting the single data stream into different portions of data packets and sending the different portions of data packets substantially simultaneously over different ones of the multiple data communication channels from the sending endpoint to the receiving endpoint;

sending sender content information over one or more of the data communication channels from the sending endpoint to the receiving endpoint;

receiving feedback information sent from the receiving endpoint over one or more of the data communication channels, wherein the feedback information is gathered for each of the data communication channels connected to the receiving endpoint;

receiving receiver content information sent from the receiving endpoint over one or more of the data communication channels gathered at the receiving endpoint;

gathering feedback information for each of the data communication channels connected to the sending endpoint; and reapportioning the data packets and sending the reapportioned data packets from the sending endpoint to the receiving endpoint substantially simultaneously over different ones of the multiple data communication channels, wherein the reapportionment is based on the feedback information gathered at the receiving endpoint, the sender content information, the receiver content information, and the feedback information gathered at the sending endpoint, wherein the sender content information and the receiver content information each comprises:

header information including timestamps or frame IDs, and content feedback comprising enhanced network statistics and calculations regarding each data communication channel and an aggregation of the multiple data communication channels.

29. A computer-readable memory medium on which is stored computer-executable process steps for causing a processor to send a single data stream from a sending endpoint to a receiving endpoint, wherein both of the sending endpoint and the receiving endpoint each have multiple data communication channels connecting the sending endpoint and the receiving endpoint, the process steps comprising:

receiving apportioned data packets sent from the sending endpoint over different ones of the multiple data communication channels, wherein the single data stream is split into different portions of data packets and the different portions of data packets are sent substantially simultaneously over different ones of the multiple data communication channels from the sending endpoint to the receiving endpoint;

receiving sender content information sent from the sending endpoint over one or more of the data communication channels;

sending feedback information to the sending endpoint over one or more of the data communication channels, wherein the feedback information is gathered for each of the data communication channels connected to the receiving endpoint;

sending receiver content information regarding streaming data received at the receiving endpoint to the sending endpoint over one or more of the data communication channels; and receiving reapportioned data packets sent from the sending endpoint substantially simultaneously over different ones of the multiple data communication channels, wherein the data packets are reapportioned based on the feedback information gathered at the receiving endpoint, the sender content information, the receiver content information and feedback information gathered at the sending endpoint for each of the data communication channels connected to the sending endpoint, wherein the sender content information and the receiver content information each comprises:

header information including timestamps or frame IDs, and content feedback comprising enhanced network statistics and calculations regarding each data communication channel and an aggregation of the multiple data communication channels.

\* \* \* \* \*